(12) United States Patent
Wright et al.

(10) Patent No.: US 7,067,037 B2
(45) Date of Patent: Jun. 27, 2006

(54) MODULAR RECIPROCATING HEAT SEAL JAW ASSEMBLY

(75) Inventors: Donald K. Wright, Murphysboro, IL (US); Christopher L. Pemberton, Marion, IL (US); James K. Hankins, Harrisburg, IL (US)

(73) Assignee: Com-Pac International, Inc, Carbondale, IL (US)

( * ) Notice: Subject to any disclaimer, the term of this patent is extended or adjusted under 35 U.S.C. 154(b) by 305 days.

(21) Appl. No.: 10/286,645

(22) Filed: Nov. 2, 2002

(65) Prior Publication Data

US 2003/0062109 A1    Apr. 3, 2003

Related U.S. Application Data

(63) Continuation-in-part of application No. 10/039,527, filed on Nov. 7, 2001, now Pat. No. 6,863,754, and a continuation-in-part of application No. 09/415,696, filed on Oct. 12, 1999.

(51) Int. Cl.
*B29C 65/18* (2006.01)
(52) U.S. Cl. .................. 156/583.1; 156/359; 156/367; 156/515; 156/530; 156/583.91; 493/209
(58) Field of Classification Search ................ 156/367, 156/359, 513, 515, 530, 553, 580, 583.1, 156/583.91; 493/189, 199, 203, 204, 209; 53/451, 574, 563, 375.9
See application file for complete search history.

(56) References Cited

U.S. PATENT DOCUMENTS 2,589,756 A * 3/1952 Waters ........................ 100/325
4,002,519 A * 1/1977 Moseley et al. ............ 156/204

(Continued)

*Primary Examiner*—Gladys JP Corcoran
(74) *Attorney, Agent, or Firm*—Vedder Price Kaufman & Kammholz

(57) ABSTRACT

A modular reciprocating heat seal jaw assembly is disclosed for sealing reclosable fastener strips to a web of thermoplastic film and for sealing the web of thermoplastic film into a series of reclosable bags. The jaw assembly includes first and second sealing jaws and means for slidably mounting the first and second sealing jaws on a first pair of parallel shafts near the lateral ends of the first and second sealing jaws in a horizontal configuration. A mechanical system is providing for selectively effecting reciprocal movement of the first and second sealing jaws together and apart as required. A modular frame is provided for supporting the first and second sealing jaws and the first and second pairs of parallel shafts and for maintaining the lateral and vertical position of the first and second sealing jaws as they are moved toward or away from each other. The modular frame and heat seal jaw assembly may be inserted into existing form-fill-seal machine to make them more efficient and accurate. An additional feature of the invention is the use of third and fourth sealing jaws constructed and arranged for sealing the reclosable fastener strips to the back wall of a web of thermoplastic film. A second mechanism is provided for selectively effecting reciprocal movement of the third and fourth sealing jaws together and apart as required to seal the fastener strips to the web of thermoplastic film. A pair of air cylinders is provided having drive shafts extending therefrom for providing mechanical force to move the first and second sealing jaws and the third and fourth sealing jaws as required. A unique mechanical drive system simultaneously advances the first and second sealing jaws together or apart in opposite movement to the third and fourth sealing jaw members, so as to either cross seal the web of thermoplastic film into a series of reclosable bags or to seal the reclosable fastener strips to the thermoplastic film as required. A method of performing the sealing of the reclosable fastener strips and web thermoplastic film into a series of reclosable bags is also disclosed.

26 Claims, 16 Drawing Sheets

U.S. PATENT DOCUMENTS

| | | |
|---|---|---|
| 4,094,729 A | 6/1978 | Boccia |
| 4,191,230 A | 3/1980 | Ausnit |
| 4,196,030 A | 4/1980 | Ausnit |
| 4,514,962 A | 5/1985 | Ausnit |
| 4,617,683 A | 10/1986 | Christoff |
| 4,655,862 A | 4/1987 | Christoff et al. |
| 4,662,978 A * | 5/1987 | Oki .................... 53/374.9 |
| 4,682,366 A | 7/1987 | Ausnit et al. |
| 4,703,518 A | 10/1987 | Ausnit |
| 4,704,842 A | 11/1987 | Boeckmann et al. |
| 4,709,398 A | 11/1987 | Ausnit |
| 4,709,533 A | 12/1987 | Ausnit |
| 4,759,642 A | 7/1988 | Van Erden et al. |
| 4,786,190 A | 11/1988 | Van Erden et al. |
| 4,790,126 A | 12/1988 | Boeckmann |
| 4,798,041 A | 1/1989 | Bentsen |
| 4,807,300 A | 2/1989 | Ausnit et al. |
| 4,832,505 A | 5/1989 | Ausnit et al. |
| 4,844,759 A | 7/1989 | Boeckmann |
| 4,848,928 A | 7/1989 | Ausnit |
| 4,876,842 A | 10/1989 | Ausnit |
| 4,878,987 A | 11/1989 | Ven Erden |
| 4,909,017 A | 3/1990 | McMahon et al. |
| 4,925,316 A | 5/1990 | Van Erden et al. |
| 4,929,225 A | 5/1990 | Ausnit et al. |
| 5,014,498 A * | 5/1991 | McMahon ................ 53/451 |
| 5,157,811 A | 10/1992 | Bodolay |
| RE34,347 E | 8/1993 | Van Erden et al. |
| RE34,905 E | 4/1995 | Ausnit |
| 5,461,845 A | 10/1995 | Yeager |
| 5,513,592 A | 5/1996 | Cotton |
| 5,542,777 A | 8/1996 | Johnson |
| 5,557,907 A | 9/1996 | Malin et al. |
| 5,558,439 A | 9/1996 | Tilman |
| 5,577,305 A | 11/1996 | Johnson |
| 5,592,802 A | 1/1997 | Malin et al. |
| 5,638,586 A | 6/1997 | Malin et al. |
| 5,700,340 A | 12/1997 | Johnson et al. |
| 5,715,580 A | 2/1998 | Johnson |
| 5,729,876 A | 3/1998 | Johnson |
| 5,747,126 A | 5/1998 | Van Erden et al. |
| 5,782,733 A | 7/1998 | Yeager |
| 5,806,984 A | 9/1998 | Yeager |
| 5,823,933 A | 10/1998 | Yeager |
| 5,829,884 A | 11/1998 | Yeager |
| 5,849,003 A | 12/1998 | Olsen et al. |
| 5,902,047 A | 5/1999 | Yeager |
| 5,927,836 A | 7/1999 | Herr et al. |
| 5,951,453 A | 9/1999 | Yeager |
| 5,953,796 A | 9/1999 | McMahon et al. |
| 5,954,433 A | 9/1999 | Yeager |
| 6,000,197 A | 12/1999 | Ausnit |
| 6,014,795 A | 1/2000 | McMahon et al. |
| 6,019,512 A | 2/2000 | Yeager |
| 6,039,525 A | 3/2000 | Johnson |
| 6,040,033 A | 3/2000 | Johnson |
| 6,059,503 A | 5/2000 | Johnson |
| 6,079,878 A | 6/2000 | Yeager |
| 6,110,586 A | 8/2000 | Johnson |
| 6,112,374 A | 9/2000 | Van Erden |
| 6,116,314 A | 9/2000 | Johnson |
| 6,131,369 A * | 10/2000 | Ausnit .................... 53/412 |
| 6,131,370 A | 10/2000 | Ausnit |
| 6,138,329 A | 10/2000 | Johnson |
| 6,138,436 A | 10/2000 | Malin et al. |
| 6,145,385 A | 11/2000 | Johnson |
| 6,152,601 A | 11/2000 | Johnson |
| 6,174,397 B1 | 1/2001 | Johnson |
| 6,177,172 B1 | 1/2001 | Yeager |
| 6,178,722 B1 | 1/2001 | McMahon |
| 6,185,907 B1 | 2/2001 | Malin et al. |
| 6,224,262 B1 | 5/2001 | Hogan et al. |
| 6,251,209 B1 | 6/2001 | Johnson |
| 6,270,257 B1 | 8/2001 | Yeager |
| 6,299,720 B1 | 10/2001 | Van Erden |
| 6,321,423 B1 | 11/2001 | Johnson |
| 6,350,340 B1 | 2/2002 | Johnson |
| 6,361,212 B1 | 3/2002 | Sprehe et al. |
| 6,383,600 B1 | 5/2002 | Johnson et al. |
| 6,422,987 B1 | 7/2002 | Hamm |
| 6,428,642 B1 | 8/2002 | Matthews et al. |
| 6,467,957 B1 | 10/2002 | Yeager |

* cited by examiner

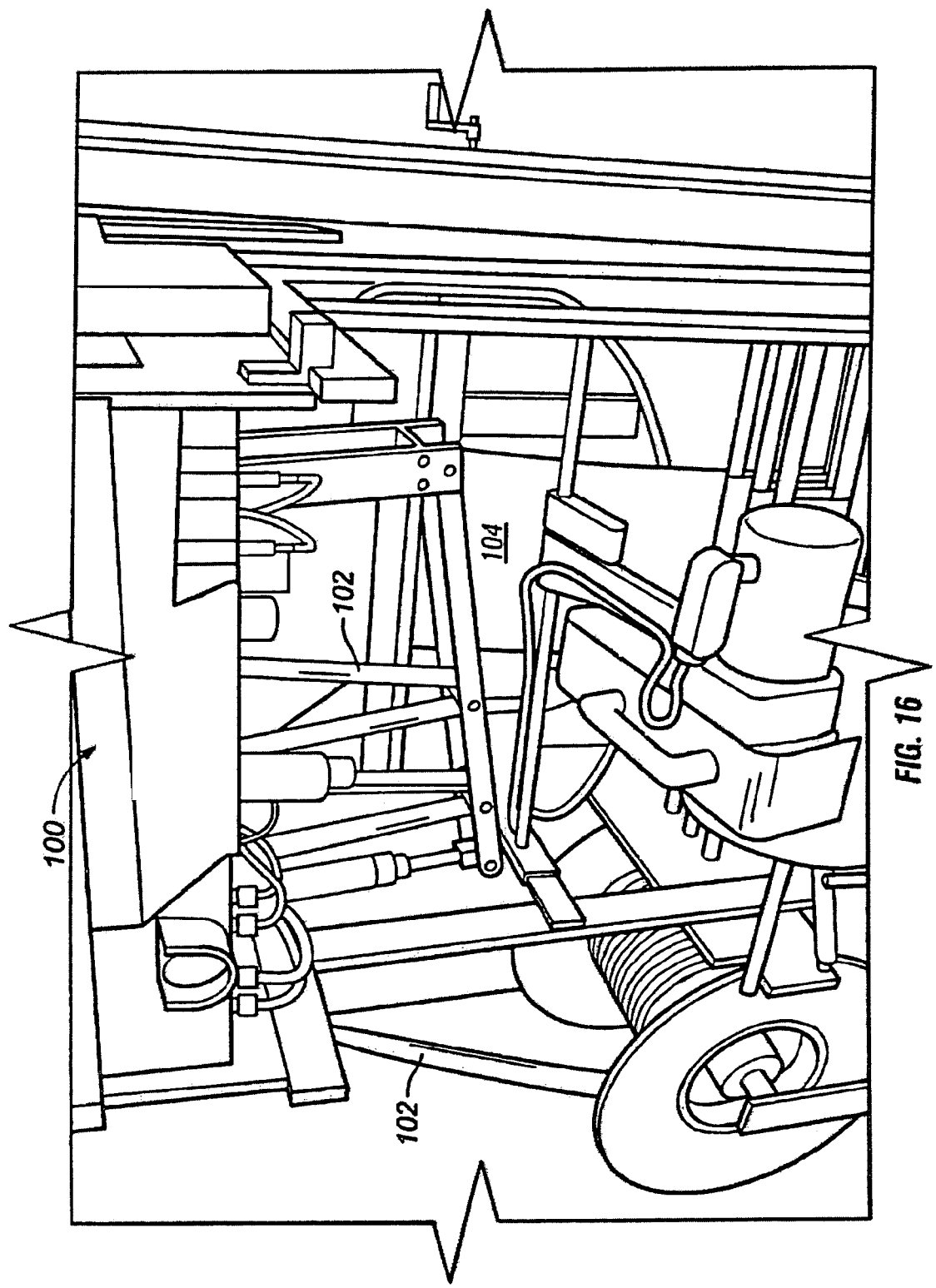

MODULAR RECIPROCATING HEAT SEAL JAW ASSEMBLY

This is a continuation-in-part application and it is based on and claims priority from U.S. Utility patent application Ser. No. 09/415,696 filed Oct. 12, 1999 and Ser. No. 10/039,527, now U.S. Pat. No. 6,863,754, filed Nov. 7, 2001.

FIELD OF THE INVENTION

The present invention relates generally to reclosable thermoplastic containers and more particularly to an apparatus for sealing reclosable fastener strips to a web of thermoplastic film and for forming the web of thermoplastic film and fastener strips into a reclosable plastic container.

BACKGROUND OF THE INVENTION

As disclosed in U.S. Pat. No. 6,361,212, a top opening reclosable bag is shown in which fastener strips are sealed on a sheet or web of plastic film in bag-length intervals, the sheet is formed into a tube, sealed along its longitudinal edges However, an apparatus for sealing the reclosable fasteners is not disclosed. A wide variety of patents are directed to the manufacture of reclosable thermoplastic containers on a form-fill-seal machine. For example, U.S. Pat. Nos. 4,617,683 and 4,655,862, inventor Christoff, are directed to transverse application of fastener profile on a web material for subsequent use on a form-fill-seal machine. Similarly, U.S. Pat. No. 4,709,533, inventor Ausney, is also directed to a method and apparatus for forming a vertical tubular form-fill package. U.S. Pat. No. 4,790,126 is directed to a fill and seal machine for reclosable bags, inventor Boeckman. U.S. Pat. No. 4,909,017, McMahon, is directed to a reclosable bag material and a method and apparatus for manufacturing material and for use in the subsequent form-fill-seal machine.

Also shown in U.S. Pat. No. 6,350,340, inventor James R. Johnson, is a method of manufacturing a web of thermoplastic film having a series of reclosable fasteners disposed thereon on one side. The web with the fasteners thereon is subsequently fed into a form-fill-seal machine, sealed along the longitudinal edges of the film to form a tube, across the open end. The film is then sealed to the back edge of the fastener profile. The film is then cross sealed again to form a sealed package containing product therein.

A continuing problem with the above-listed systems is the coordination of the top seal with the mechanism for sealing the back surface of the fastener profile to the film. In addition, although form-fill-seal machines are widely used, the addition of fastener profiles thereon requires the addition and installation of complex equipment which is relatively difficult to adjust.

Accordingly, it is an object of the present invention to provide an apparatus for cross-sealing tubes of thermoplastic film having a series of reclosable fastener profiles sealed thereon and to provide an apparatus for sealing the back edges of the fastener profile to the film, all in a modular system.

It is an additional object of the present invention to provide such an apparatus that can be used for sealing top and bottom seals sequentially on a form-fill-seal machine.

An additional object of the present invention is to provide a seal configuration for top opening containers which provides air-tight seal of the reclosable fasteners to the film while not sealing the opposing sides of the tube of plastic film together.

SUMMARY OF THE INVENTION

A novel reciprocating heat seal jaw assembly is disclosed for sealing reclosable fastener strips to a web of thermoplastic film and for sealing the web of thermoplastic film into a series of reclosable bags. The jaw assembly includes the first and second sealing jaws slidably mounted on a first pair of parallel shaft members. The shaft members are mounted near the ends of each of the sealing jaws in a substantially horizontal plane. A mechanism is provided for effecting reciprocal movement of the jaws together and apart as required and the jaws are mounted in modular frame for supporting the jaws and the shaft members and for maintaining the lateral and vertical position of the jaws. In a preferred embodiment, the mechanism comprises one or more reciprocal drive mechanisms. A first drive shaft extends laterally from the first reciprocal drive mechanism. At least a pair of drive arms are connected to the first drive shaft, one on each end, and are pivotally attached to the first and second sealing jaws for effecting the selective reciprocal movement of the sealing jaws. The pair of drive arms include a first right rotating drive arm having the first drive shaft fixedly attached thereto at the midpoint of the first right rotating drive arm so as to allow rotation of the first right rotating drive arm. A first left rotating drive arm is also provided having the first drive shaft fixedly attached thereto at the midpoint of the first left rotating drive arm, again allowing rotation of the first left rotating drive arm. A first right outer linear drive arm is pivotally connected to the first right rotating drive arm near the first distal end of the first right rotating drive arm and pivotally connected to the first sealing jaw near the first lateral end thereof. Similarly, a first left outer linear drive arm is pivotally connected to the first left rotating drive arm and is pivotally connected to the first sealing jaw near the second lateral end thereof. The first and second lateral ends of the first sealing jaw correspond to the left and right ends of the sealing jaw. As a result, when the first drive shaft is rotated, it causes the first left and right outer linear drive arms to be selectively moved in the direction of the first sealing jaw for the first 180 degrees of rotation and then pulled in a direction away from the first sealing jaw in the second 180 degrees of rotation, thereby causing the first sealing jaw and second sealing jaws to slide either towards or away from each other on the first pair of parallel shafts.

The heat seal jaw assembly further includes a first right inner linear dive arm pivotally connected to the first right rotating drive arm near a second distal end thereof. The first right inner linear drive arm is pivotally connected at its opposite end to the second sealing jaw proximate a first lateral or right end thereof. A first left inner linear drive arm is pivotally connected to the first left rotating drive arm near a second distal end thereof. The first left inner linear drive arm is pivotally connected at its opposite end to the second sealing jaw proximate a second lateral or left end thereof. As a result, when the first drive shaft is rotated, it causes both the first right and left inner linear drive arms to be selectively moved in the direction of or away from the second sealing jaw along the shafts simultaneously with and opposite to the movement of the first left and right outer linear drive arms thereby selectively opening and/or closing the first and second sealing jaws. In a preferred embodiment, reciprocal movement of the first and second sealing jaws brings them into an abutting position in which the web of thermoplastic material is cross sealed and a second separated position which allows the web of thermoplastic material to be advanced between the first and second sealing jaws.

The preferred embodiment of the first reciprocal drive mechanism as previously mentioned is a first air cylinder having a plurality of airlines extending therefrom connected at first and second connectors to the first air cylinder and having a source of pressurized air connected to the airlines. The first air cylinder is constructed and arranged to rotate the first drive shaft in the first desired direction and to a selected degree of rotation when air is introduced into the first connector. The first drive shaft maybe rotated in the opposite direction to an opposite degree of rotation when air is introduced to the second connector which causes the left and right drive arms to effect horizontal movement of the first and second sealing jaws either together or part, as desired.

The jaw assembly further includes a second pair of parallel shaft members disposed in a substantially horizontal plane parallel to the first pair of parallel shaft members. The second pair of parallel shafts is attached to the third and fourth sealing jaws near the lateral ends thereof whereby greater stability is provided during movement of the third and fourth sealing jaws and greater precision is provided in positioning the third and fourth sealing jaws during sealing of the reclosable fastener strips to the web of the thermoplastic film.

In a preferred embodiment, the mechanism for reciprocal movement of the third and fourth sealing jaws includes a second air cylinder having at least two air lines extending therefrom and connected thereto at third and fourth connectors. A source of pressurized air is connected to the airlines. A second drive shaft extends from the lateral ends of the second air cylinder. A second right rotating drive arm is attached to the right end of the second drive shaft at the mid-point of the second right rotating drive arm. A second left rotating drive arm is attached to the left end of the second drive shaft at the mid-point of the second left rotating drive arm. A second right outer linear drive arm is pivotally attached at its proximal end to the second right rotating drive arm at the first distal end thereof. A second left outer linear drive arm is pivotally attached at its proximal end to the second left rotating drive arm at the first distal end thereof. A second right inner linear drive arm is pivotally attached at its proximal end to the second right rotating drive arm at the second distal end thereof. A second left inner linear drive arm is pivotally attached at its proximal end to the second left rotating drive arm at the second distal end thereof.

The second air cylinder is constructed and arranged to rotate the second drive shaft in a first desired direction for a selected degree of rotation when the air is introduced into a third connector and for rotating the second drive shaft in the opposite direction for an opposite degree of rotation when air is introduced into a fourth connector. As a result, the second left and right outer linear drive arms effect horizontal movement of the third sealing jaw and the second left and right inner linear drive arms effect horizontal movement of the fourth sealing jaw so as to bring the third and fourth sealing jaws together or to separate them as required.

In a preferred embodiment, the pivotal attachment mechanisms of the first and third sealing jaws and the first and second right and left outer linear drive arms includes a first pair of ball joints mounted proximate the lateral ends of the first sealing jaw and a second pair of ball joints mounted proximate lateral ends of the third sealing jaw. Each of the drive arms is pivotally attached to one of the ball joints at the distal end of each of the drive arms. The ball joints may further include a spring extending axially from the ball joint such that one of the drive arms extends axially through the ball joint and into the spring. One or more lock nuts are threaded onto the end of the drive arms proximate the distal ends thereof so that the drive arms are attached to the ball joint but are vertically and horizontally pivotal. The springs, in addition to holding the drive arms on the sealing jaws, also act as a shock absorber for substantially fixing the axial position of the drive arms relative to the seal jaws while allowing pivotal movement of the drive arms. They also act as a means of providing controlled compression of the sealing jaws when they are abutting each other, i.e. the drive arms pull the sealing jaws towards each other and the spring resists such compression to a desired degree.

Each of the drive arms are preferably comprised of a first, rectangular section and a second, rod-shaped section extending axially away from the first, rectangular section. In a preferred embodiment, the rectangular portion has a bore at is distal end (relating to the pivotable connection to the respective drive arm) thereof and the rod-shaped section is threadedly contained and affixed in the bore. Each of the drive arms further includes a bore extending through the first rectangular section at the proximal end thereof with a fastening mechanism extending through the bore for rotatably connecting the rectangular section to the first distal end of the respective rotating drive arm. In a preferred embodiment, the fastening mechanism is a bolt extending through the bore and through a corresponding bore in the side of the respective rotating drive arm proximate the first distal end thereof. The bolt has a head for retaining the bolt in the bore and a lock nut on the distal end of the bolt and pivotally attached thereto in the inner surface of the rotating drive arm for rotatably connecting, by means of the nut and bolt, the drive arm to the rotatable drive arm.

In a preferred embodiment, the mechanism for slidably mounting the first and second sealing jaws on the shaft members comprises a plurality of sleeve bearings laterally disposed on the first and second sealing jaws, each of the sleeve bearings also being coaxially disposed about one of the shaft members so that the first and second sealing jaws are slidably supported and maintained in parallel as they are advanced together, or separated apart.

In order to heat the sealing jaws, wires are connected to the sealing jaws and an electric power source is connected to the wires for providing heat. A temperature control mechanism connected to the electric power source measures the temperature of the sealing jaws, heats the sealing jaws and maintains the sealing jaws at a desired temperature.

In order to transmit power from the air cylinders through the drive shafts to the rotating drive arms, a plurality of pillow block bearings are provided on the frame having the drive shafts extending rotatably therethrough for supporting the drive shafts during rotation.

The first and second sealing jaws are sized, constructed and arranged for cross sealing the web of thermoplastic material so as to form a series of bags therefrom. The third and fourth sealing jaws are sized, constructed and arranged for sealing the reclosable fastener strips to one side of thermoplastic web. The modular reciprocating heat seal jaw assembly is preferably installed on a vertical form-fill-seal machine for forming the thermoplastic web into a series of thermoplastic bags having the reclosable fastener strips contained therein and heat sealed thereto. Preferably, one side of a series of reclosable fastener strips are sealed in bag length intervals on the web. Thus, the form-fill-seal machine forms the web of thermoplastic film into a tube having a series of reclosable fastener strips disposed on an inside surface of the newly formed tube of thermoplastic film. For each bag, the third and fourth sealing jaws compress and seal the unsealed side of the reclosable fastener strip associated with the particular bag to the opposite inside surface of the tube of thermoplastic film. A reclosable fastener strip comprises a first and second reclosable fastener profile. The first reclosable fastener profile preferably comprises a base and a pair of lateral flanges extending vertically therefrom, a pair of longitudinal flanges extending horizontally, and a pair of upwardly extending closure members extending from the base. A second reclosable fastener profile having a base and a pair of flanges extending vertically therefrom, a pair of longitudinal flanges extending horizontally, and a pair of upwardly extending closure members is provided. In operation, the closure members from the first and second reclosable fastener profiles are selectively interlockable so as to form an air and water tight seal that are manually separable, as required.

A perforation knife is affixed to the third and fourth sealing jaws for perforating the web of thermoplastic material so as to allow selective manual access to the reclosable fastener within the bag, thereby allowing separation of the closure elements and access to the interior bag.

The third and fourth sealing jaws each comprise a pair of rectangularly shaped, vertical seal surfaces sized, disposed and separated by sufficient distance to seal the lateral flanges of the fastener profiles to the web (i.e., the tube of thermoplastic film) without interfering with the interlocking and disengagement of closure members. A pair of rectangularly shaped, horizontal seal surfaces is sized, disposed and separated at a sufficient distance to seal the longitudinal flanges of the fastener profiles to the web (i.e., the tube of thermoplastic film) without interfering with interlocking or disengagement of the closure members. Thus, when the third and fourth sealing jaws are brought together and heated, the fastener profiles are sealed to the web.

The invention further includes a method of forming a plurality of bags from a web of thermoplastic material, the web having a series of interlocking fastener profiles sealed to one surface of the web. Each of the bags has a pair of reclosable fastener profiles sealed thereon. The method comprises the steps of longitudinally sealing the edges of the web to form a sealed tube, cross sealing the web at bag length intervals above the fastener profiles, sealing the unsealed side of the fastener profiles to the inside surface of the web so as to form an airtight seal of the bag, perforating the surface of the web above the fastener profile so as to provide selective digital access to the profile strips, and cutting and separating the bags from the web. The bags maybe filled with product prior to forming an airtight seal of the bag and separation from the web.

BRIEF DESCRIPTION OF THE DRAWINGS

FIG. 16 of the drawings is a rear perspective view of a form-fill-seal machine used with the modular heat seal jaw assembly of FIGS. 2–7.

DETAIL DESCRIPTION OF THE PREFERRED EMBODIMENT

While the present invention is shown with several specific embodiments, the invention is not limited thereto insofar as those who have the disclosure before them are able to make modifications and variations therein without departing from the scope of the invention.

Figure 1:
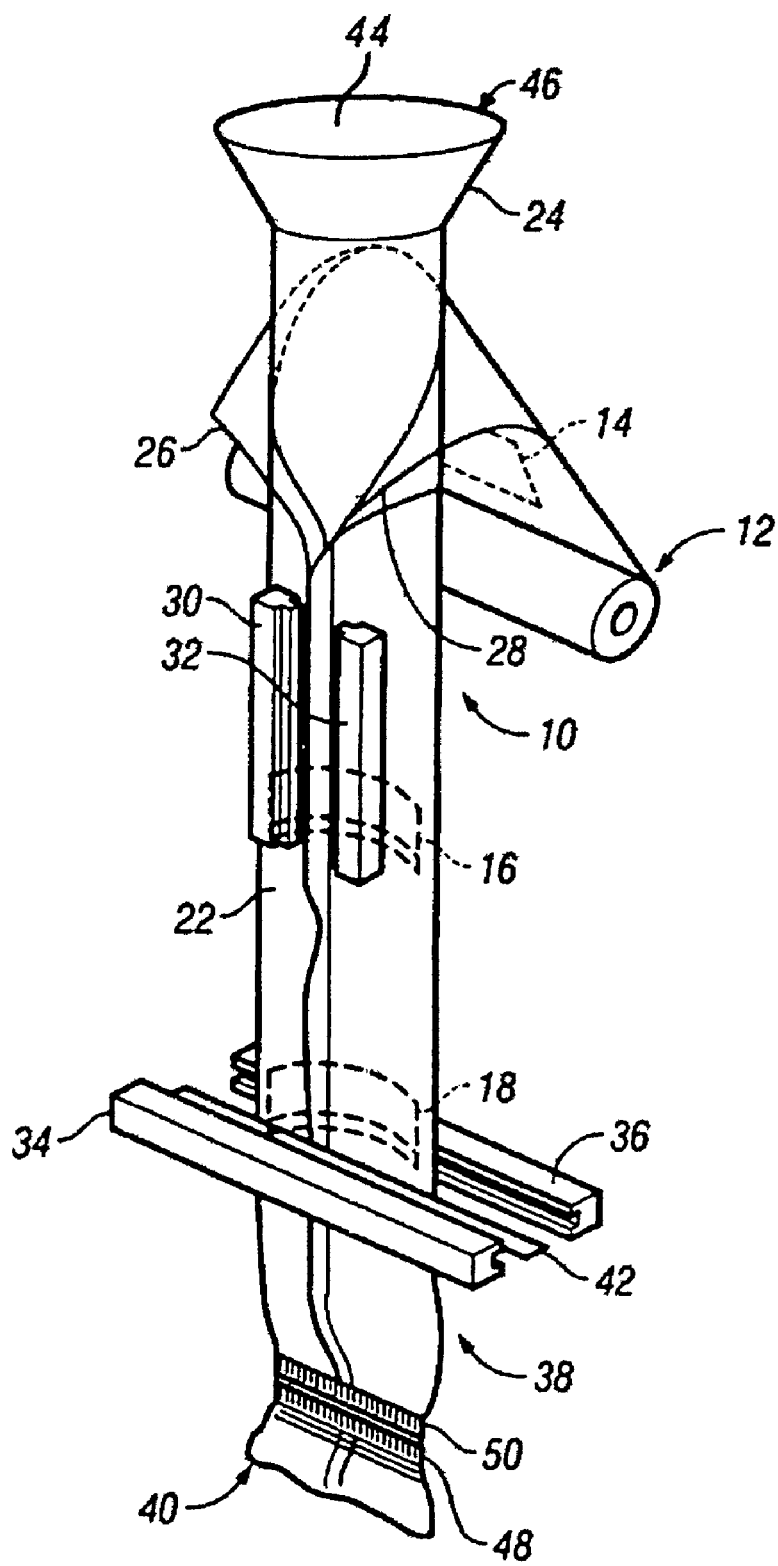
FIG. 1 of the drawings is a front perspective view of a schematic diagram of a prior art vertical form-fill-seal machine.

As shown in FIG. 1 of the drawings, a schematic diagram of a prior art form-fill-seal machine 10. As known in the prior art, a web of thermoplastic material 12 is provided having a series of reclosable fastener strips such as reclosable fastener strips 14, 16 and 18 to an outer surface of web 12. Web 12 is unrolled and formed into a tube 22 around filling tube 24. Once formed into a tube 22, the lateral edges 26 and 28 of tube 22 are longitudinally sealed together by means of vertical sealing jaws 30 and 32. Thereafter, heated cross seal jaws 34 and 36 seal laterally across tube 22 so as to form a series of interconnected bags such as bags 38 and 40. In the embodiment shown, a cutting knife 42 was provided within heated cross sealing jaw 34 as to allow separation of bags 38 and 40 after sealing. As commonly known in the prior art, sealing jaws 34 and 36 are also used to grip tube 22 and pull it downwardly around filling tube 24, so as to advance tube 22 and the dispensing of web 12. Filling tube 24 contains an aperture 44 at its top end 46 which is used for dropping product (not shown) through filling tube 24 and into a bag. For instance, after bag 40 is filled, it is advanced downwardly and cross sealed along its top edge 48. Simultaneously, bag 38 is cross sealed along its bottom edge 50.

Figure 2:
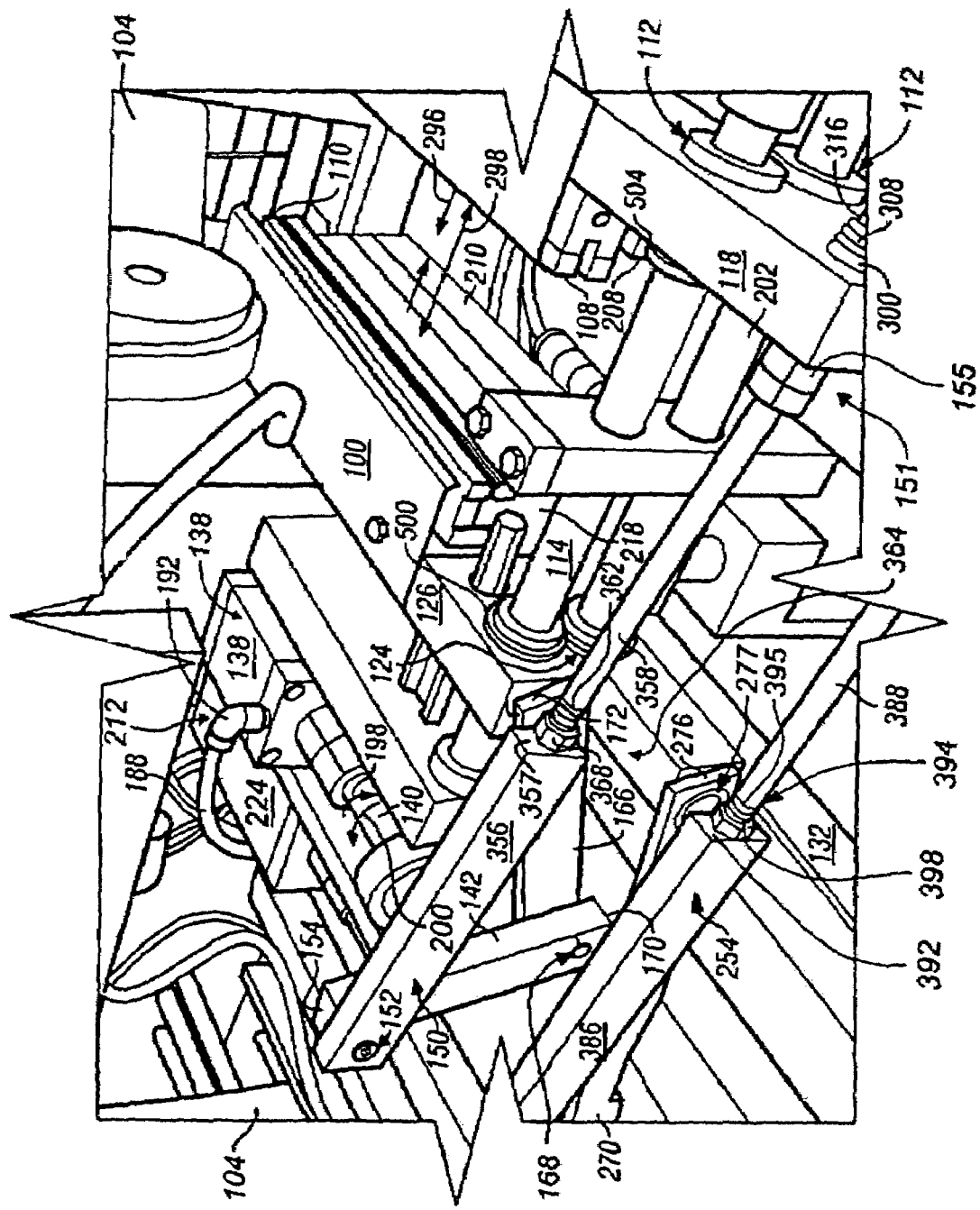
FIG. 2 of the drawings is a side perspective view of the front portion of the modular reciprocating heat seal jaw assembly of the present invention.
Figure 5:
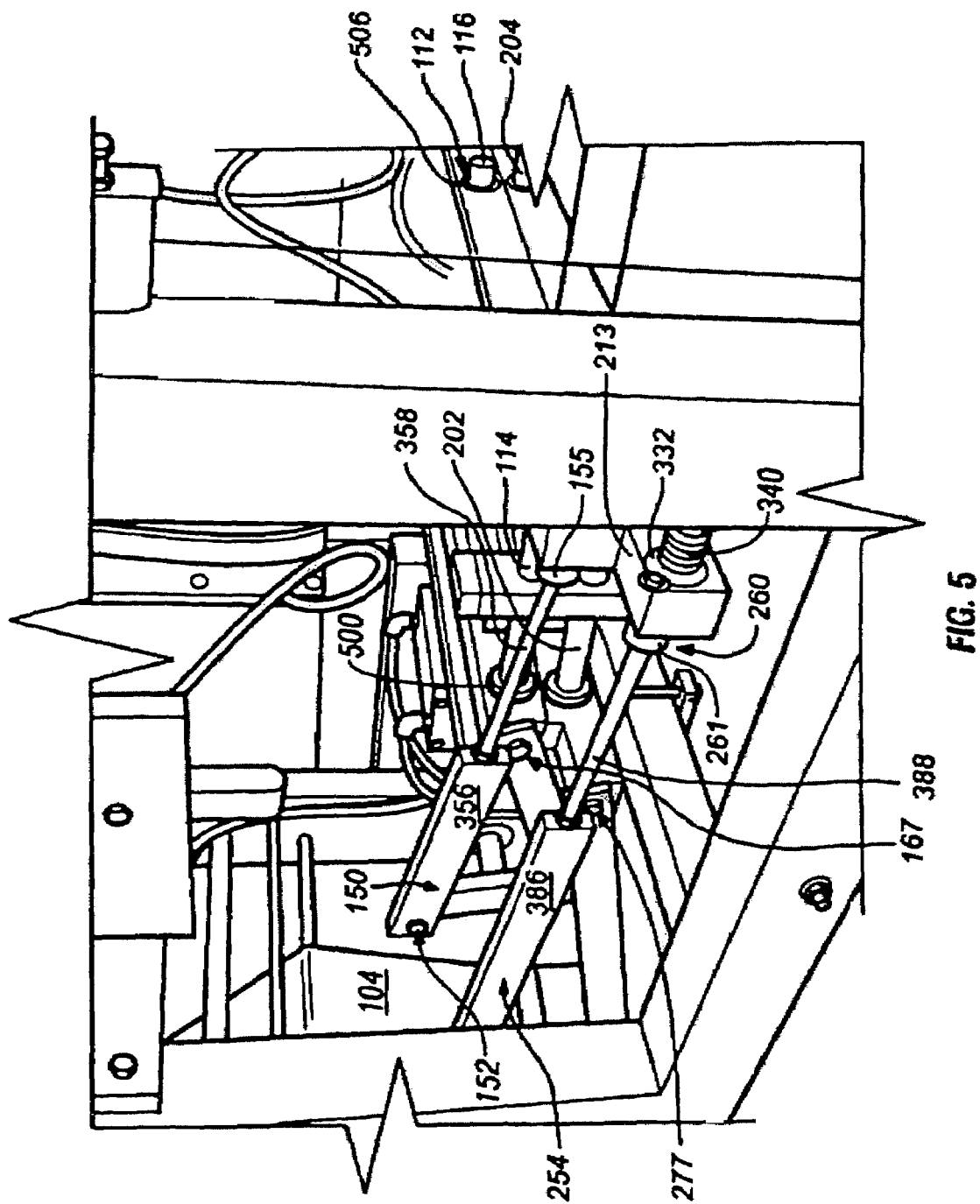
FIG. 5 of the drawings is a side perspective view of the front portion of the modular reciprocating heat seal jaw assemblies of FIGS. 2–4 showing, in particular, the double arm mechanism for first and second sealing jaws and for third and fourth sealing jaws.

As shown in FIG. 2 of the drawings, a modular reciprocating heat seal jaw assembly 100 is disclosed. Modular reciprocating heat seal jaw assembly 100 is used for sealing, among other things, a series of reclosable fasteners strips 102 to a web of thermoplastic film 104, best seen in FIG. 16. Web 104 is converted into a series of reclosable plastic bags 106, shown in cross-sectional views in FIG. 12. The heat seal jaws assembly 100 includes, as shown in FIG. 2, first sealing jaw 108, and second sealing jaw 110. Mechanism 112 is provided for slidably mounting the first sealing jaw 108 on a first pair of parallel shaft members 114 and 116 (FIGS. 2, 5 and 6) proximate to and perpendicular to a first lateral end 118 and a second lateral end 120 (FIG. 6) of first sealing jaw 108. Shaft members of the first pair of parallel shaft members 114 and 116 are disposed in a substantially horizontal plane. A mechanism 124 is provided for slidably mounting the second sealing jaw 110 on the first pair of parallel shaft members 114 and 116 proximate to and perpendicular to a first lateral end 126 and a second lateral end 128 (FIG. 6) of the second sealing jaw 110. A first reciprocal drive mechanism 138 is further provided for selectively effecting reciprocal movement of the first and second sealing jaws 108 and 110 together and apart. By together 296, we mean towards each other, and by apart 298, we mean separating from each other. A modular frame 132 is provided for supporting sealing jaws 108 and 110 and for supporting the first pair of parallel shaft members 114 and 116, thereby maintaining the lateral and vertical positions (not shown) of first and second sealing jaws 108 and 110.

Figure 3:
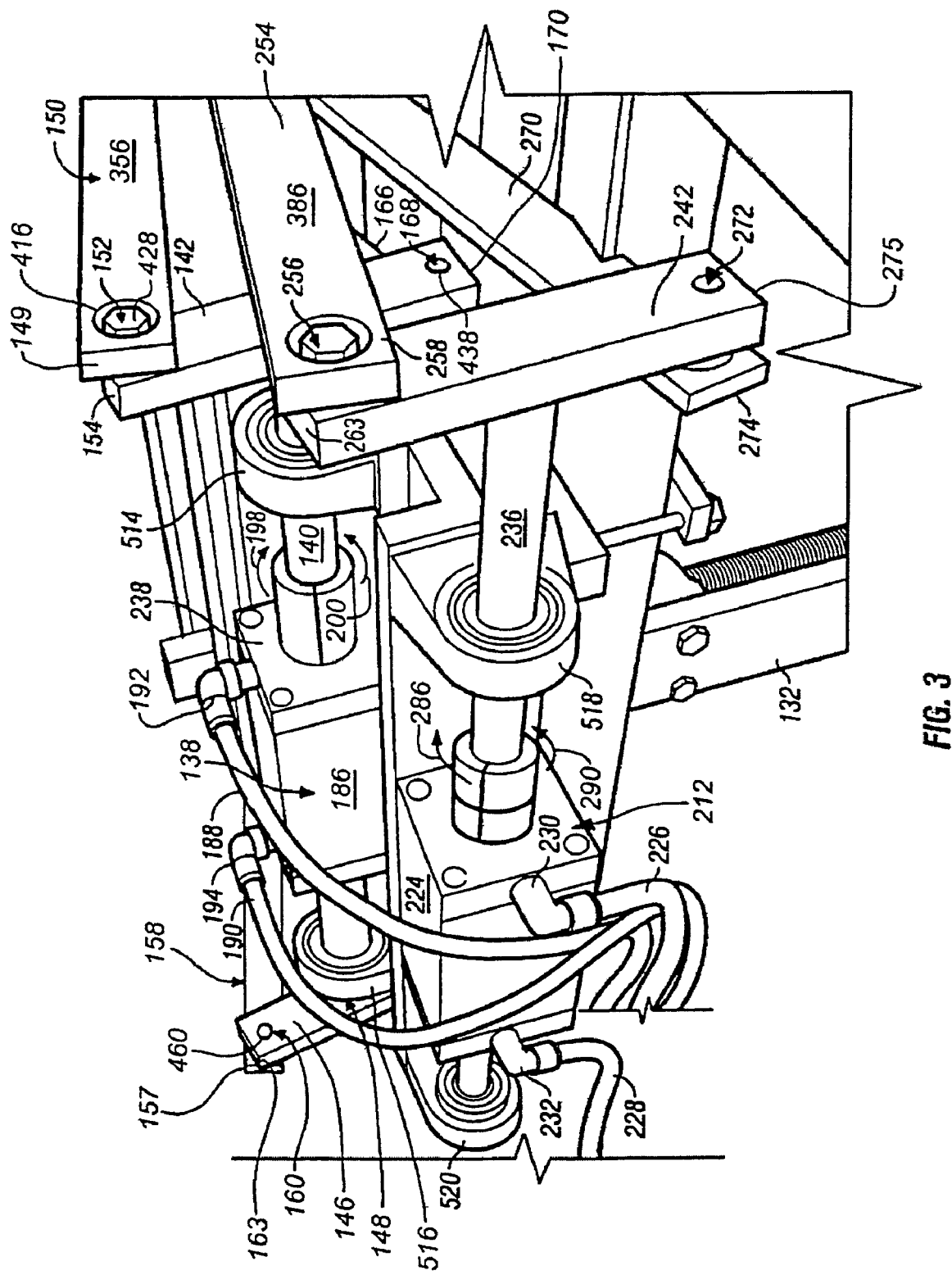
FIG. 3 of the drawings is a side perspective view of the rear portion of the modular reciprocating heat seal jaw assembly of FIG. 2.

As best seen in FIG. 3 of the drawings, a first reciprocal drive mechanism 138 is used to move first sealing jaw 108 and second sealing jaw 110. A first drive shaft 140 extends laterally from the first reciprocal drive mechanism 138 (specifically, from the first air cylinder 186 described below). One end of the first drive shaft 140 is fixedly attached at the midpoint 144 (FIG. 7) of a first right rotating drive arm 142 so as to allow rotation of the first right rotating drive arm 142. The opposite end of the first drive shaft 140 is fixedly attached to a first left rotating drive arm 146 at its midpoint 148 (FIG. 3) such that the first left rotating drive arm 146 extends parallel to the first right rotating drive arm 142. Rotation of first drive shaft 140 thus causes rotation of both first night rotating drive arm 142 and first left rotating drive arm 146. A first right outer linear drive arm 150 at its proximal end 149 is pivotally connected at pivotable connection 152 to the first right rotating drive arm 142 near a first distal end 154 of the first right rotating drive arm 142. Additionally, the first right outer linear drive arm 150, near its distal end 151, is pivotally connected at pivotable connection 155 (FIG. 2) to the first sealing jaw 108 near a first lateral end 118 of first sealing jaw 108. A first left outer linear drive arm 158 at its proximal end 157 is pivotally connected at a pivotable connection 160 (FIG. 3) to the first left rotating drive arm 146 near a first distal end 163 of the first left rotating drive arm 146. Additionally, the first left cater linear drive arm 158, near its distal end (not shown), is pivotally connected at pivotable connection (not shown) to first sealing jaw 108 near the second lateral end 120 (FIG. 6) of the first sealing jaw 108. As a result, upon rotation of first drive shaft 140, first right outer linear drive arm 150 and first left outer linear drive arm 158 are moved in the direction of first sealing jaw 108, or pulled in the direction away from first sealing jaw 108.

As further illustrated in FIGS. 2 and 3, modular reciprocating heat seal jaw assembly 100 further includes a first right inner linear drive arm 166 and a first left inner linear drive arm (not shown). The first right inner linear drive arm 166 at its proximal end (not shown) is pivotally connected at pivotable connection 168 to the first right rotating drive arm 142 proximate a second distal end 170 of the first right rotating drive arm 142. The first right inner linear drive arm 166 is pivotally connected at its distal end 172 at pivotable connection 167 (FIG. 5) to the second sealing jaw 110 proximate a first lateral end 126 (FIG. 2) thereof. Similarly, the first left inner linear drive arm at its proximal end (not shown) is pivotally connected at a pivotable connection (not shown) to the first left rotating drive arm 146 (FIGS. 3 and 6) near a second distal end (not shown) of the first left rotating drive arm 146. The first left inner linear drive arm is also pivotally connected at its distal end (not shown) at a pivotable connection (not shown) to the second sealing jaw 110 proximate a second lateral end 128 (FIG. 6) of second seating jaw 110. As a result when first drive shaft 140 is rotated, first right inner linear drive arm 166 and first left linear drive arm are moved either in the direction of or in the direction away from first sealing jaw 108. This is done opposite to the movement of the first right outer linear drive arm 150 and first left outer linear drive arm 158. As a result, first sealing jaw 108 and second sealing jaw 110 are either moved towards each other 296 until they abut and press against each other or are moved away from each other 298 along the first pair of parallel shaft members 114 and 116 thereby opening the space between first sealing jaw 108 and second sealing jaw 110.

As best seen in FIG. 3, first reciprocal drive mechanism 138 includes a first air cylinder 186 having a pair of air lines 188 and 190 extending therefrom and connected thereto at first connector 192 and second connector 194, respectively. A source of pressurized air (not shown) is connected to air lines 188 and 190. First air cylinder 186 is constructed and arranged to rotate first drive shaft 140 in a first desired direction 198 for a selected degree of rotation. In a preferred embodiment first drive shaft 140 is rotated 90 degrees when air is introduced into first connector 192. When the opposite movement is required, first drive shaft 140 is rotated in the opposite direction 200 and to an opposite degree of rotation, again preferably 90 degrees, when air is introduced into the second connector 194. Note, when air is introduced into second connector 194, it is simultaneously cut off from introduction into first connector 192. As a result, first drive shaft 140 causes first right rotating drive arm 142 and first left rotating drive arm 146 to rotate 90 degrees thereby effecting movement of first right outer linear drive arm 150 through pivotable connection 152 and movement of first left outer linear drive arm 158 through pivotable connection 160. As a result, first sealing jaw 108 is moved either towards or away from the second sealing jaw 110, as required. Similarly, the first right inner linear drive arm 166 is caused to move by its pivotable connection 168 to first right rotating drive arm 142, and the first left inner linear drive arm is caused to move by its pivotable connection to first left rotating drive arm 146 thereby causing second sealing jaw 110 to move either towards first sealing jaw 108 or away from first sealing jaw 108, as required.

Returning to FIGS. 2 and 5, the modular reciprocating heat seal jaw assembly of FIG. 100 further includes a second pair of parallel shaft members 202 and 204 disposed in a substantially horizontal plane which is parallel to the first pair of parallel shaft members 114 and 116. Further provided is a third sealing jaw 208 and a fourth sealing jaw 210 (FIG. 2). A second reciprocal drive mechanism 212 is further provided for reciprocal movement of third sealing jaw 208 and fourth sealing jaw 210 either towards 296 or away 298 from each other. Similar to the first sealing jaw 108, mechanism 112 is provided for slidably mounting the third sealing jaw 208 on the second pair of parallel shafts 202 and 204 proximate to and perpendicular to a first lateral end 213 (FIG. 5) and a second lateral end 215 (FIG. 6) of the third sealing jaw 208. Similar to the second sealing jaw 110, mechanism 124 is provided for slidably mounting the fourth sealing jaw 210 on the second pair of parallel shaft members 202 and 204 proximate to and perpendicular to a first lateral end 217 (FIG. 2) and a second lateral end 219 (FIG. 6) of the fourth sealing jaw 210. As further illustrated, the second pair of parallel shaft members 202 and 204 are preferably disposed parallel to and below the first pair of parallel shaft members 114 and 116. As a result, greater stability is provided during movement of third sealing jaw 208 and fourth sealing jaw 210 and greater precision is provided in positioning of third sealing jaw 208 and fourth sealing jaw 210 during scaling of reclosable fastener strips 102.

Figure 6:
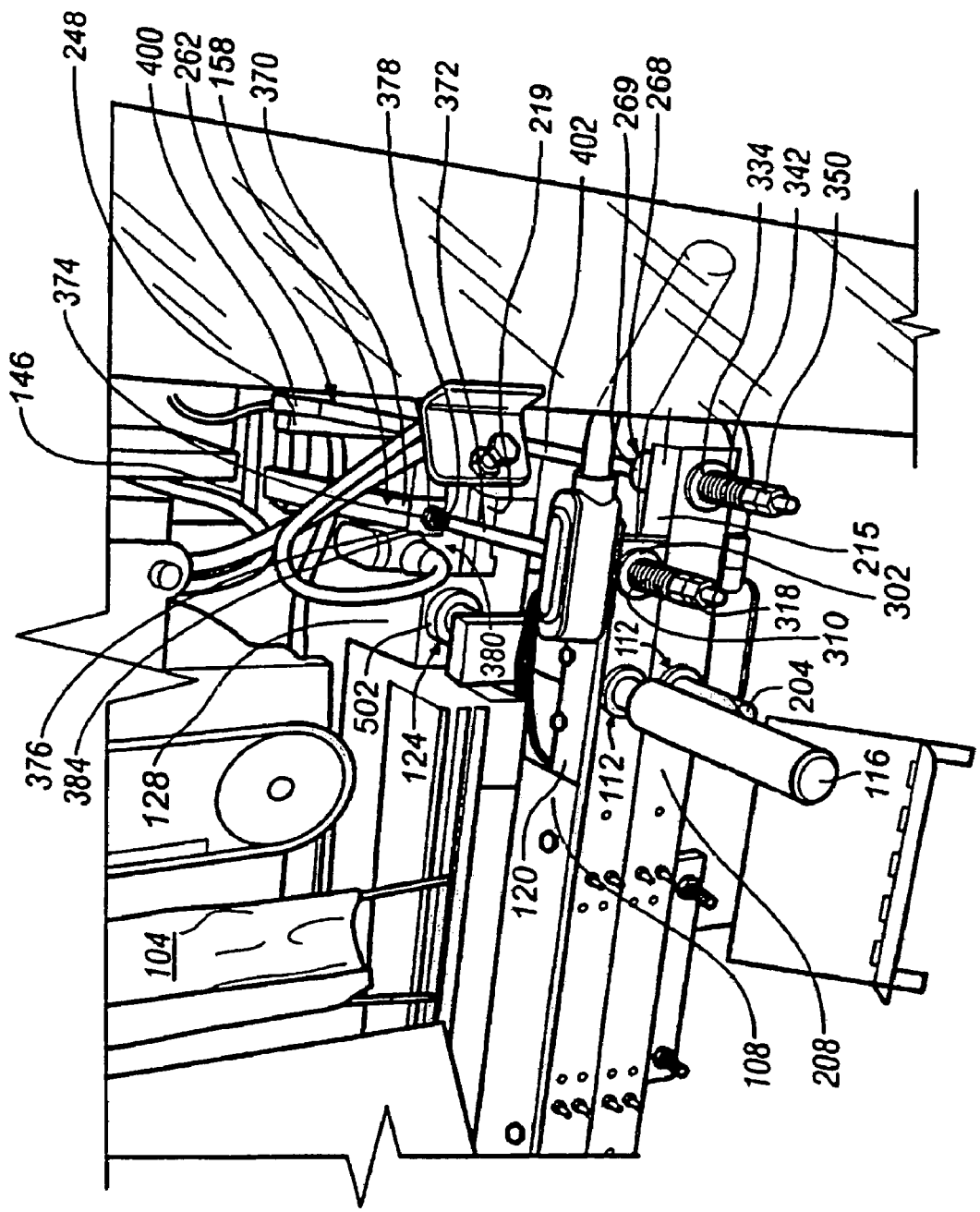
FIG. 6 of the drawings is a front perspective view of the modular reciprocating heat seal jaw assembly of FIGS. 2–5 showing, in particular, the jaw assembly mounted on a vertical form-fill-seal machine with a tube of plastic film being disposed vertically and depending downwardly towards the space between the seal and jaws.

As further shown in FIG. 3, the second reciprocal drive mechanism 212 for reciprocal movement of third sealing jaw 208 and fourth sealing jaw 210 includes a second air cylinder 224 having air lines 226 and 228 extending therefrom and connected thereto at third connector 230 and fourth connecter 232, respectively. A source of pressurized air (not shown) is further provided and is connected to air lines 226 and 228. A second drive shaft 236 extends laterally from the second reciprocal drive mechanism 212 (specifically, from the second air cylinder 224). One end of the second drive shaft 236 is fixedly attached to the midpoint 246 (FIG. 7) of the second right rotating drive arm 242. A second left rotating drive arm 248 as shown in FIG. 6 of the drawings is attached to the opposite end of second drive shaft 236 and at the midpoint (not shown) of second left rotating drive arm 248. A second right outer drive arm 254 (FIG. 3) at its proximal end 258 is pivotally connected at pivotable connection 256 to the second right rotating drive arm 242 near a first distal end 263 of the second right rotating drive arm 242. Additionally, the second right outer linear drive arm 254, near its distal end 260 (FIG. 5), is pivotally connected at pivotable connection 261 to the third sealing jaw 208 near the first lateral end 213 of the third sealing jaw 208. The second left outer linear drive arm 262 (FIG. 6) at its proximal end (not shown) is pivotally connected at a pivotable connection (not shown) to the second left rotating drive arm 248 near a first distal end (not shown) of the second left rotating drive arm 248. Additionally, the second left outer linear drive arm 262, near its distal end 268, is pivotally connected at a pivotable connection 269 to the third sealing jaw 208 near a second lateral end 215 of the third sealing jaw 208. As a result, upon rotation of the second drive shaft 236, second right outer linear drive arm 254 and second left linear drive arm 262 are moved in the direction of the third sealing jaw 208, or pulled in the direction away from the third sealing jaw 208.

As further illustrated in FIGS. 2 and 3, modular reciprocating heat seal jaw assembly 100 further includes a second right inner linear drive arm 270 and a second left inner linear drive arm (not shown). The second right inner linear drive arm 270 at its proximal end 274 is pivotally connected at pivotable connection 272 to the second right rotating drive arm 242 near a second distal end 275 of the second right rotating drive arm 246. The second right inner linear drive arm 270 is pivotally connected at its distal end 276 at pivotable connection 277 (FIG. 2) to the fourth sealing jaw 210 proximate a first lateral end 217 thereof. Similarly, the second left inner linear drive arm (not shown) at its proximal end (not shown) is pivotally connected at a pivotable connection (not shown) to the second left rotating drive arm 248 (FIG. 6) near a second distal end (not shown) of the second left rotating drive arm 248. The second left inner linear drive arm is also pivotably connected at its distal end (not shown) at a pivotable connection (not shown) to the fourth sealing jaw 210 proximate a second lateral end 219 (FIG. 6) of the fourth sealing jaw 210. As a result, when the second drive shaft 236 is rotated, second right inner linear drive arm 270 and second left inner linear drive arm are moved either in the direction of or in the direction away from the third sealing jaw 208. This is done opposite to the movement of the second right outer linear drive arm 254 and second left outer linear drive arm 262. As a result, third sealing jaw 208 and fourth sealing jaw 210 are either moved towards each other 296 or away from each other 298 along the second pair of parallel shaft members 202 and 204.

Returning to FIG. 3), second air cylinder 224 is constructed and arranged to rotate second drive shaft 236 in a first desired direction 286 for a selected degree of rotation, preferably 90 degrees, when air is introduced into third connector 230. For rotating second drive shaft 236 in the opposite direction 290, the flow of air into third connector 230 is ceased. Air is introduced into fourth connector 232, causing second drive shaft 236 to rotate in the opposite direction 290 and to an opposite degree of rotation, again preferably 90 degrees. Similar to the first air cylinder 186, it should be understood that, when air is introduced into fourth connector 232, it is simultaneously cut off from introduction into third connector 230. This introduction of air into either the third or fourth connectors 230 or 232 causes second right outer linear drive arm 254 and second left outer linear drive arm 262 to effect horizontal movement 296 or 298 of third sealing jaw 208. Similarly, second right inner linear drive arm 270 and second left inner linear drive arm are moved thereby effecting horizontal movement 296 or 298 of fourth sealing jaw 210 so as to bring third sealing jaw 208 and fourth sealing jaw 210 together or apart, as required.

As described above and with respect to FIG. 2, the modular heat seal jaw assembly 100 includes mechanisms for selective reciprocal movement of the first sealing jaw 108 and second sealing jaw 110 and the third sealing jaw 208 and the fourth sealing jaw 210. The reciprocating movement comprises reciprocating the jaws between a first abutting position illustrated by directional arrow 296 representative of horizontal movement, in which the web of cross thermoplastic material 104 is cross sealed and a second, separated position illustrated by directional arrow 298 representative of horizontal movement which allows the web of thermoplastic material 104, best seen in FIG. 6, to be advanced between the first sealing jaw 108 and the second sealing jaw 110 and, thus, also between the third sealing jaw 208 and the fourth sealing jaw 210.

Figure 17A:
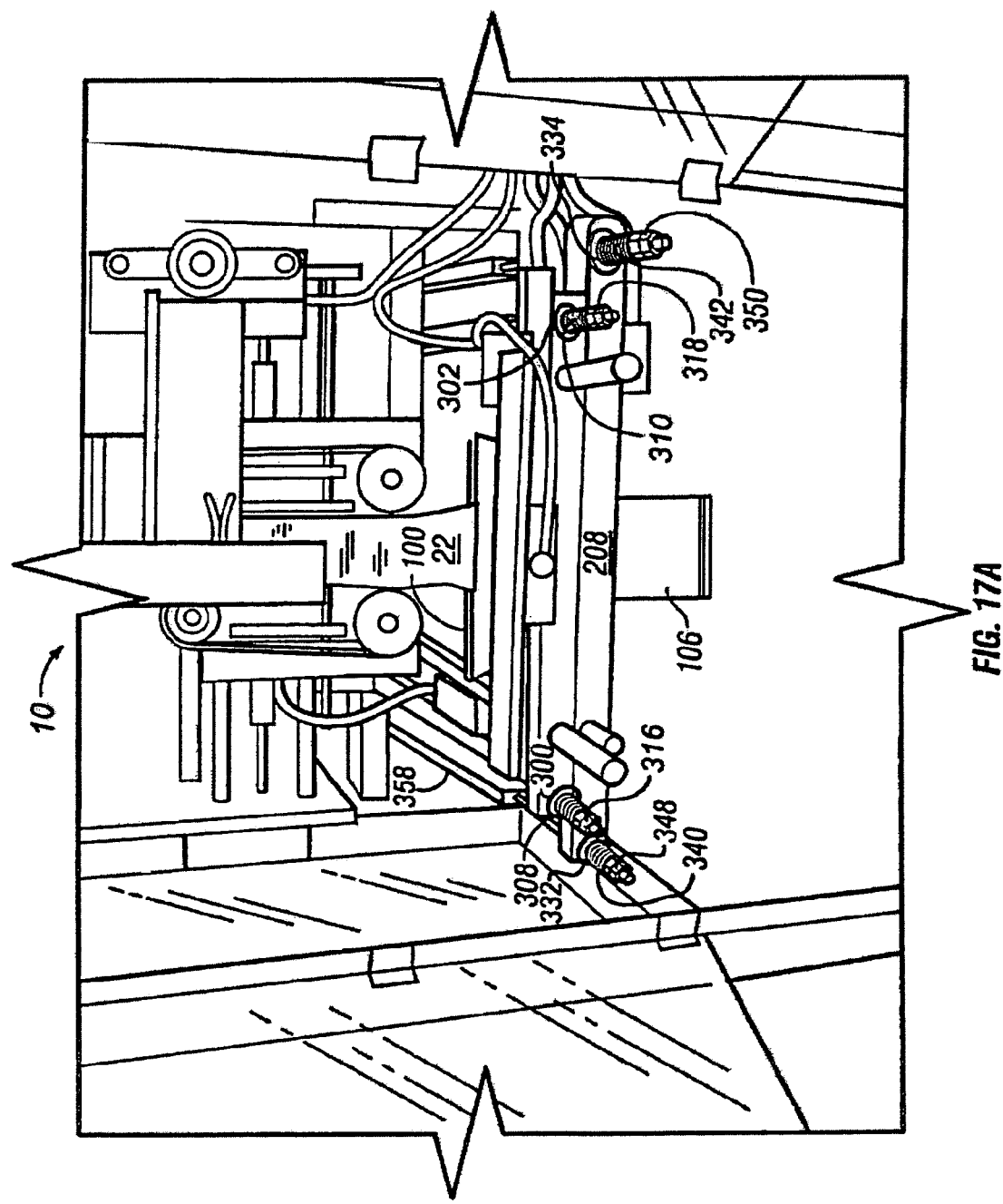
FIGS. 17A, 17B and 17C of the drawings are various perspective views of a form-fill-seal machine having a modular heat seal jaw assembly of FIGS. 2–7 attached thereon.

In a preferred embodiment, first sealing jaw 108 and second sealing jaw 110, when they are abutting in first abutting position 296, have a compressive force of 150 pounds, plus or minus 50 pounds. Further, in order to seal thermoplastic web 104 with a cross seal, first sealing jaw 108 and second sealing jaw 110 are heated. First sealing jaw 108 is heated to a temperature of 330° Fahrenheit "F."), which is used for heat sealing the back side of the reclosable bags 106 (FIG. 17A). Second sealing jaw 110 is heated to a temperature of 120° F. for sealing the front side of the bag. A temperature range between 50° F. and 400° F. can be used depending on the thickness of the film and pneumonic compression applied As further seen in FIGS. 2 and 6 of the drawings, pivotable connections (e.g., 155) connect the first outer right linear drive arm 150 and the first left outer linear drive arm 158 to the first sealing jaw 108. The first right outer linear drive arm 150, as mentioned previously, is pivotally connected at pivotable connection 155 to the first sealing jaw 108 near a first lateral end 118 thereof. The first left outer linear drive arm 158 is pivotally connected at a pivotable connection (not shown) to first sealing jaw 108 near a second lateral end 120 (FIG. 6) thereof. Pivotable connection 155 may be accomplished by means of a first ball joint 300 mounted near the first lateral end 118 of the first sealing jaw 108. Similarly, the pivotable connection connecting the left outer linear drive arm 158 to the first sealing jaw 108 may be accomplished by means of a second ball joint 302 mounted near the second lateral end 120 of the first sealing jaw 108.

As further seen in FIGS. 2, 5, 6 and 17A, first ball joint 300 has a first spring member 308 extending axially therefrom with first right outer linear drive arm 150 extending through the first ball joint 300 and through first spring member 308. Second ball joint 302 has a second spring member 310 extending axially therefrom with first left outer linear drive arm 158 extending through the second ball joint 302 and the second spring member 310. First and second lock nuts 316 and 318 are threadably attached to the distal end 151 of first right outer linear drive arm 150, and the distal end (not shown) of first left outer linear drive arm 158, respectively. Lock nuts 316 and 318 are used to compress first spring member 308 and second spring member 310 against first sealing jaw 108. As a result, spring members 308 and 310 tend to act as shock absorbers when compressing first sealing jaw 108 against second sealing jaw 110. Therefore, when first sealing jaw 108 and second sealing jaw 110 are butted against each other, first and second spring members 308 and 310, acting as shock absorbers, apply uniform compression of the heat seal jaws 108 and 110 against each other. Furthermore, the first and second spring members 308 and 310 tend to align first sealing jaw 108 against second sealing jaw 110 in vertical alignment with each other.

A similar system is utilized for connecting the second right outer linear drive arm 254 and the second left outer linear drive arm 262 to the third sealing jaw 208. As mentioned previously, the second right outer drive arm 254 is pivotally connected to third sealing jaw 208 by pivotable connection 261. Pivotable connection 261 includes a third ball joint 332 mounted near the first lateral end 213 of third sealing jaw 208. Similarly, the second left outer linear drive arm 262 is connected to third sealing jaw 208 by pivotable connection 269. Pivotable connection 269 includes a fourth ball joint 334 mounted near the second lateral end 215 of third sealing jaw 208. Again, a third spring member 340 extends axially from third ball joint 332 with second right outer linear drive arm 254 extending through third ball joint 332 and through third spring member 340. A fourth spring member 342 extends axially from fourth ball joint 334 with second left outer linear drive arm 262 extending through fourth ball joint 334 and through fourth spring member 342. A third lock nut 348 is threadably attached to the distal end 260 of second right outer linear drive arm 254 which fixedly attaches second right outer linear drive arm 254 to third ball joint 332 but allows it to be vertically and horizontally pivotably therein by means of third spring member 340. Similarly, a fourth lock nut 350 is threadably attached to second left outer linear drive arm 262 near the distal end 268 thereof which fixedly attaches second left outer linear drive arm 262 to fourth ball joint 334 and to fourth spring member 342, but which allows second left outer linear drive arm 262 to be vertically and horizontally pivotable therein.

As seen in FIGS. 2–6 of the drawings, first right outer linear drive arm 150 includes a rectangular section 356 and a rod-shaped section 358. Rectangular section 356 contains a bore (not shown) extending axially into it at its distal end 357 (relative to pivotable connection 152) which is sized for reception of the rod-shaped section 358. Rod-shaped section 358 has threading 362 thereon along its proximal end 364. Similarly, corresponding threading 366 (not shown) is machined into the bore. As a result, rod-shaped section 358 may be threadedly engaged with the bore. A lock nut 368 is circumferentially disposed about rod-shaped section 358 and is threaded onto threading 362 until it comes into abutment and locking engagement with the distal end 357 of the rectangular section 356. Rod-shaped section 358 is thus fixedly attached to rectangular section 356. First outer left linear drive arm 158 as shown in FIG. 6 of the drawings has a rectangular section 370 and a rod-shaped section 372. Rectangular section 370 has a bore (not shown) extending axially into it at its distal end 376 (relative to pivotable connection 160) which is sized for reception of the rod-shaped section 372. Rod-shaped section 372 has threading 378 thereon along its proximal end 380. Similarly, corresponding threading (not shown) is machined into the bore. As a result, rod-shaped section 372 may be threadedly engaged into the bore. A lock nut 384 is circumferentially disposed about rod-shaped section 372 and is threaded onto threading 378 until it comes into abutment and locking engagement with distal end 376 of rectangular section 370. Rod-shaped section 372 is thus fixedly attached to rectangular section 370.

As further seen in FIG. 2, second right outer linear drive arm 254 includes a rectangular section 386 and a rod-shaped section 388. The rectangular section has a bore (not shown) extending axially into it at its distal end 392 (relative to pivotable connection 256) which is sized for reception of the rod-shaped section 388. Rod-shaped section 388, at its proximal end 394, has threading 395 thereon. Similarly, corresponding threading (not shown) is machined into the bore. As a result, rod-shaped section 388 may be threadedly engaged into the bore. A lock nut 398 is circumferentially disposed about rod-shaped section 388 and is threaded onto threading 394 until it comes into abutment and locking engagement with the distal end 392 of rectangular section 386. Thus, rod-shaped section 388 is fixedly attached to rectangular section 386.

As further seen in FIG. 6, second left outer linear drive arm 262 includes a rectangular section 400 and a rod-shaped section 402. Rectangular section 400 has a bore (not shown) at its distal end (not shown) (relative to the pivotable connection connecting the second left outer linear drive arm 262 to the second left rotating drive arm 248) which is sized for reception of the rod-shaped section 402. Rod-shaped section 402, at its proximal end (not shown) has threading (not shown) thereon. Similarly, corresponding threading (not shown) is machined into the bore. As a result, rod-shaped section 402 may be threadedly engaged into the bore. A lock nut (not shown) is circumferentially disposed about rod-shaped section 402 and is threaded onto threading of the rod-shaped section 402 until it comes into abutment and locking engagement with distal end of rectangular section 400. Rod-shaped section 402 is thus fixedly attached to rectangular section 400.

The purpose of this combination of a rectangular section and a rod shaped section is to allow the pivotal connection of rectangular sections 356, 370, 386 and 400 with respective rotating drive arms 142, 146, 242 and 248. At the same time, rod shaped sections 358, 372, 388 and 402 are constructed for telescopic engagement into first ball joint 300, second ball joint 302, third ball joint 332 and fourth ball joint 334, respectively. This allows transformation of rotational movement to linear movement and reduces the amount of space required and material for performing this linear motion.

As further seen in FIG. 3, rectangular section 356 of the first right outer linear drive arm 150 has a lateral bore 416 extending laterally therethrough near the proximal end 149 of the first right outer linear drive arm 150 (specifically, the rectangular section 356). As described above, pivotable connection 152 is used to pivotally attach the first right outer linear drive arm 150 to the first right rotating drive am 142. Preferably, pivotable connection 152 is a fastening mechanism that includes a bolt (not shown) extending through lateral bore 416, and through a corresponding bore (not shown) in the right rotating drive arm 142 near the first distal end 154 thereof. The bolt has a head (not shown) thereon for retaining it in the bores. Additionally, the bolt may have threading (not shown) at a first distal end (not shown) thereof. A lock nut 428 may be fixedly attached to the bolt by means of the threading at the first distal end of the bolt and is positioned in the inner surface (not shown) of bore 416. The lock nut 428 may contain a lock thereon so as to pivotally attach a right rotating drive arm 142 to first right outer linear drive arm 150.

Similarly, the second distal end 170 of first fight rotating drive arm 142 has a lateral bore (not shown) extending therethrough. As described above, pivotable connection 168 is used to pivotally attach the first right rotating drive arm 142 to the first right inner linear drive arm 166. Preferably, pivotable connection 168 includes a bolt 438 telescopically received in the lateral bore and extending through a similar bore (not shown) near the proximal end (not shown) of the first right inner linear drive arm 166. Bolt 438 may include a lock nut (not shown) fixedly attached thereto. As a result, rotation of first right rotating drive arm 142 will cause linear movement forward or back of first right outer linear drive arm 150 and first right inner linear drive am 166.

First right inner linear drive arm 166, near its distal end 172 may be pivotally mounted to second sealing jaw 110 at its first lateral end 126. A bolt 167 (FIG. 5) extends laterally through a bore (not shown) near the distal end 172 of first right inner linear drive arm 166 and into the first lateral end 126 of the second sealing jaw 110, and is fixedly attached therein. The bolt 167 rotably connects the distal end 172 of first right inner drive arm 166 to the first lateral end 126 of the second sealing jaw 110. As a result, when the first right inner linear drive arm 166 is moved forward it causes forward linear motion of second sealing jaw 110 and when it is reversed it pulls second sealing jaw 110 away from first sealing jaw 108. In a preferred embodiment, a similar system of bolts, bores and lock nuts is utilized for pivotable connections connecting the second right rotating drive am 242 with the second right outer linear drive arm 254, the second right rotating drive arm 242 with the second right inner linear drive arm 270, the second right inner linear drive am 270 with the fourth sealing jaw 210, and the various left drive arms in the manner explained above.

As previously mentioned, first sealing jaw 108 and second sealing jaw 110 are slidably mounted on the first pair of parallel shaft members 114 and 116. This slidable mounting is accomplished by means of mechanisms 112 and 124. In one embodiment, mechanisms 112 and 124 consist of sleeve bearings 500 (FIGS. 2 and 5) and 502 (FIG. 6) in second sealing jaw 110 and sleeve bearings 504 (FIG. 2) and 506 (FIG. 5) in first sealing jaw 108. Sleeve bearings 500–506 are co-axially disposed about the first pair of parallel shaft members 114 and 116, respectively, so that first scaling jaw 108 and the second sealing jaw 110 may be slidably supported and maintained in parallel as they are advanced together or apart.

Figure 17B:
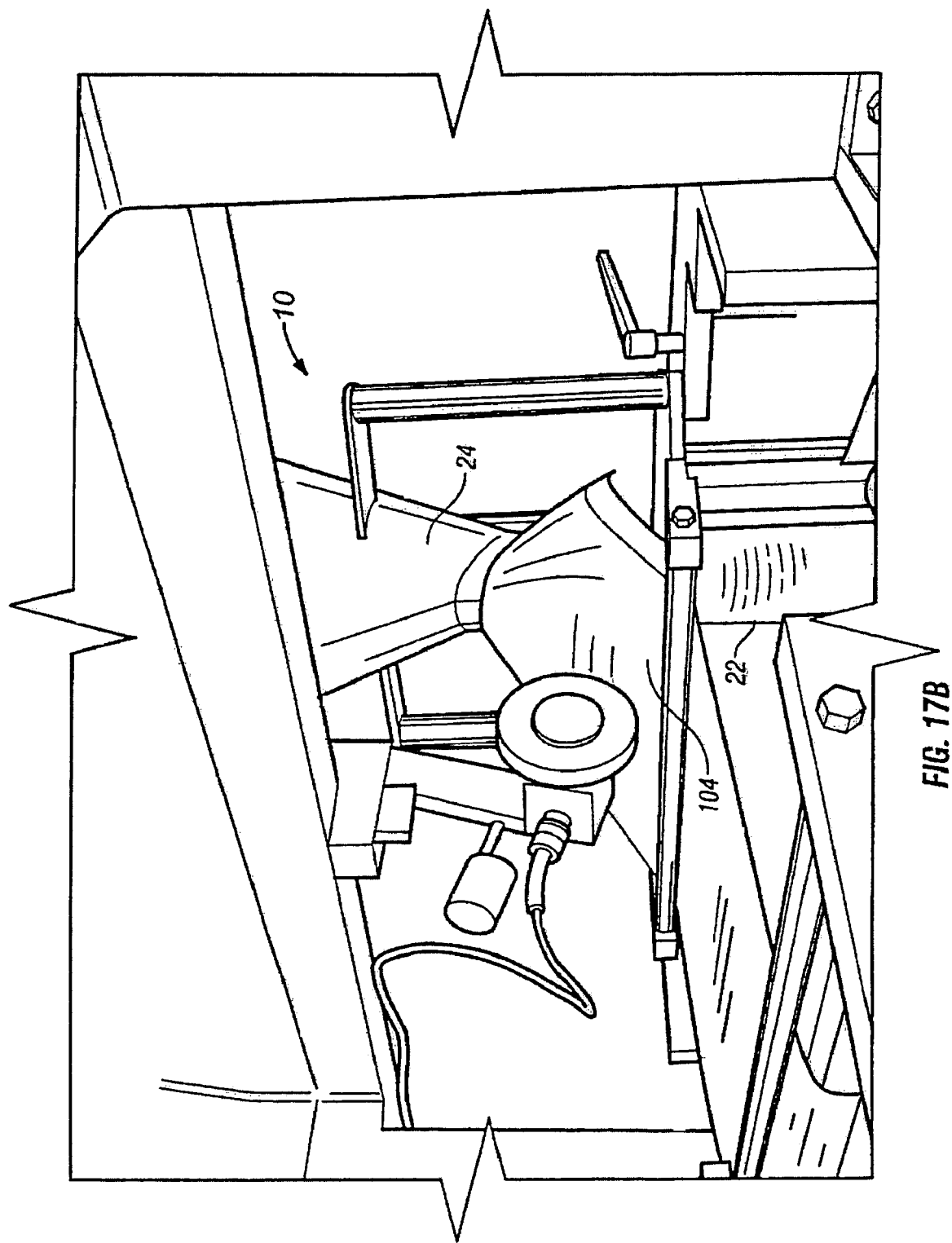
Figure 17C:
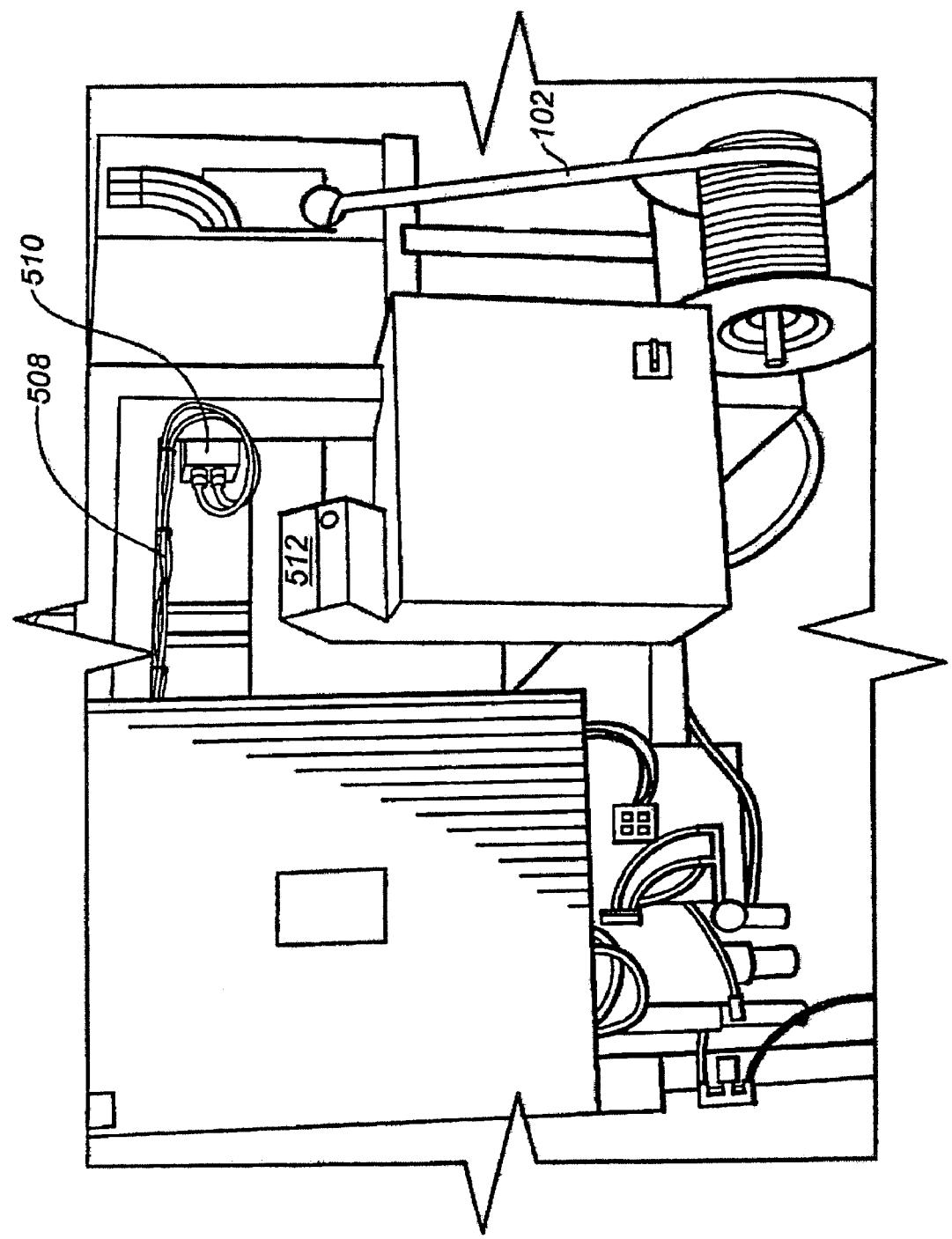
Figure 18A:
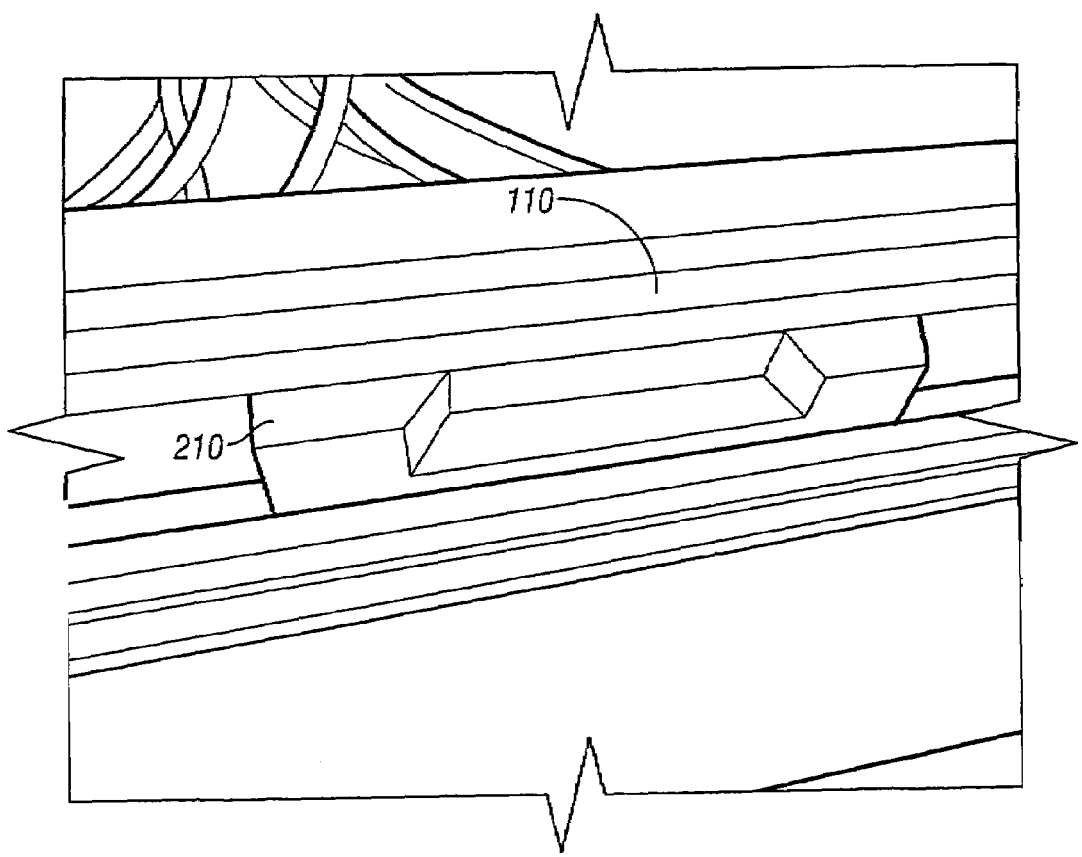
FIGS. 18A and 18B of the drawings are various perspective views, partially broken away of the second and fourth sealing jaws and, the first and third sealing jaws, respectively, of the modular reciprocating heat seal jaw assembly of FIGS. 2–7.
Figure 18B:
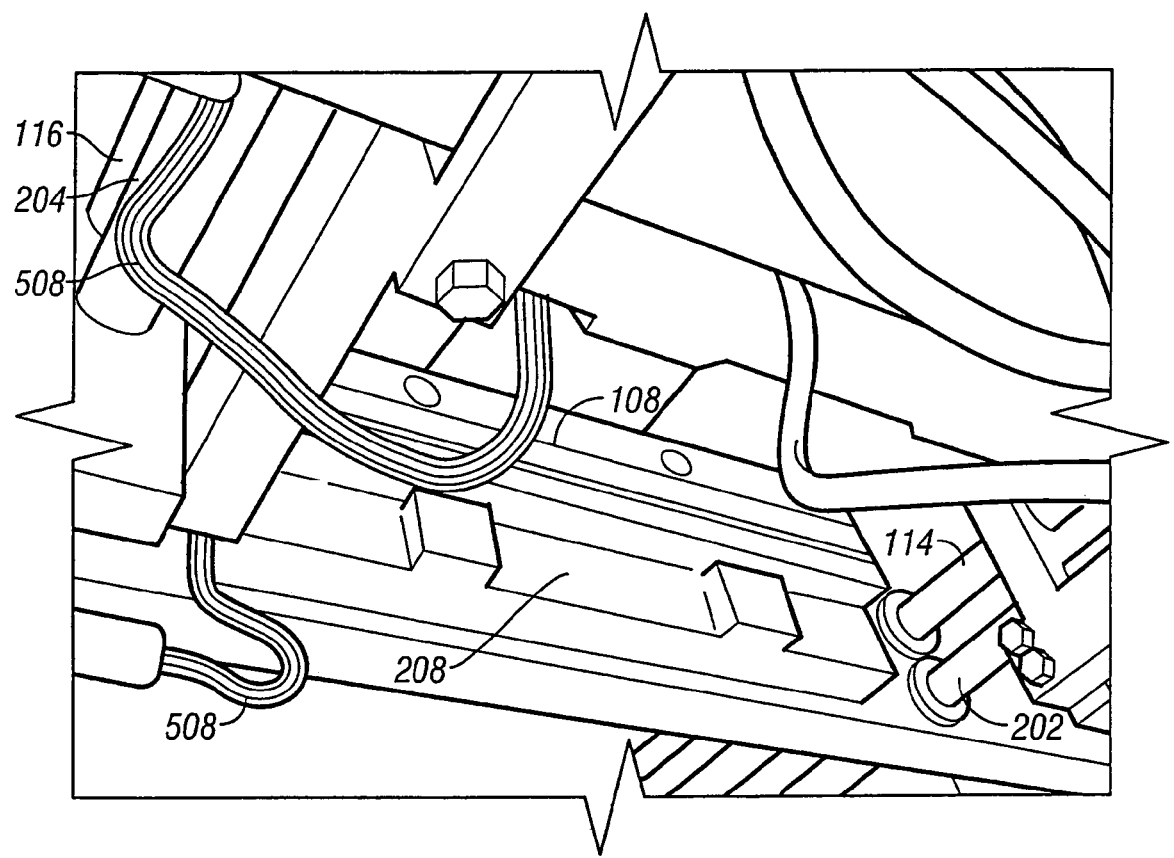

It is further seen in FIGS. 17C and 18D, a plurality of wire members 508 are connected to the first sealing jaw 108 and second sealing jaw 110. An electric power source 510 (FIG. 17C) is connected to the wire members 508 so as to provide means for heating sealing jaws 108 and 110. A temperature control mechanism 512 (FIG. 17C) is connected to the electric power source 510 for measuring the temperature of the first sealing jaw 108 and the second sealing jaw 110, heating the sealing jaws to a desired temperature and maintaining the sealing jaws at the desired temperature. For example, the temperature range of the second sealing jaw 110 in a preferred embodiment is between 300° F. and 350° F. which may be modified or controlled by the temperature controller 512 to a range between 50° F. and 400° F., as required.

Figure 4:
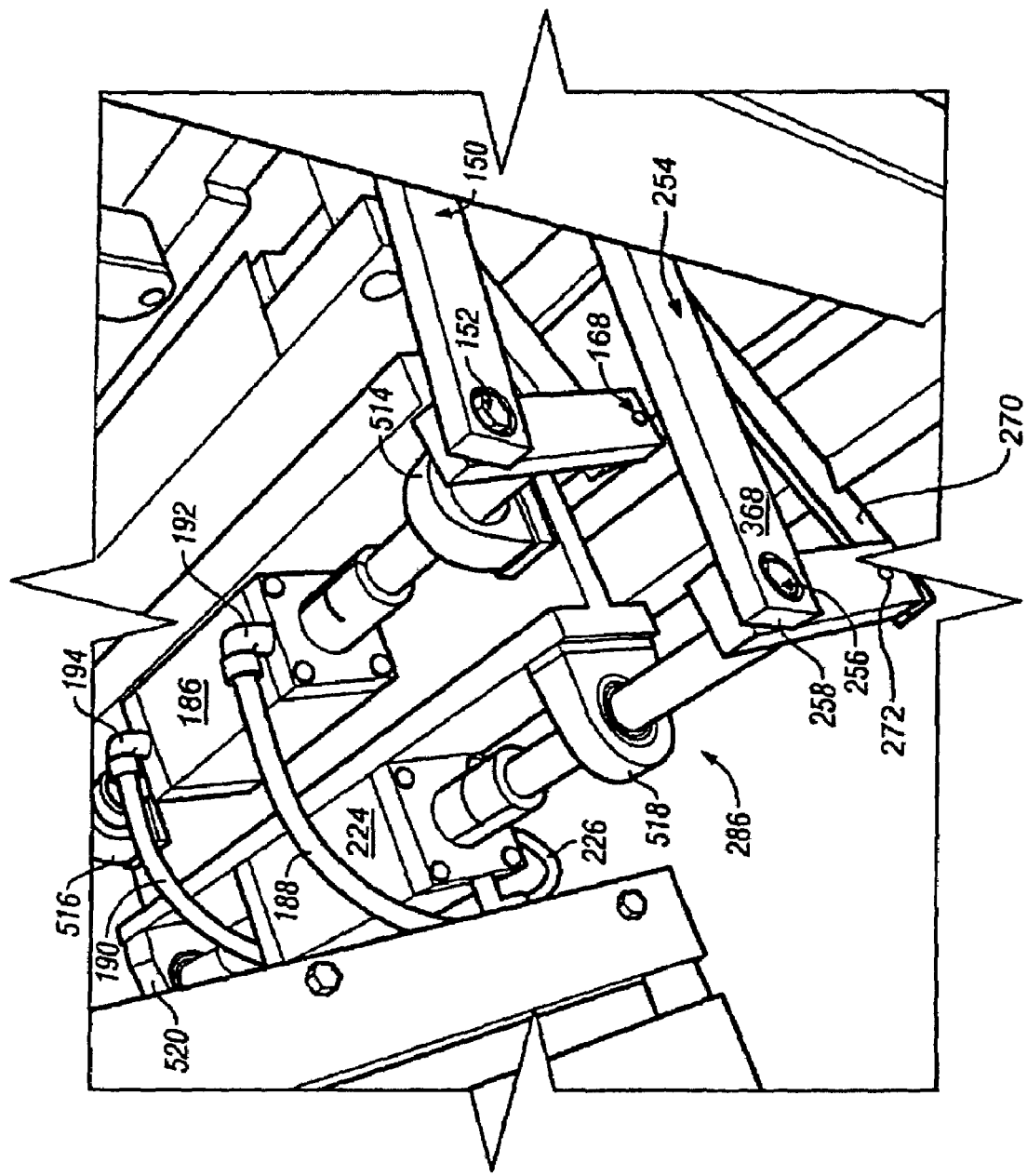
FIG. 4 of the drawings is a top perspective view of the rear portion of the modular reciprocating heat seal jaw assembly of FIGS. 2 and 3.
Figure 7:
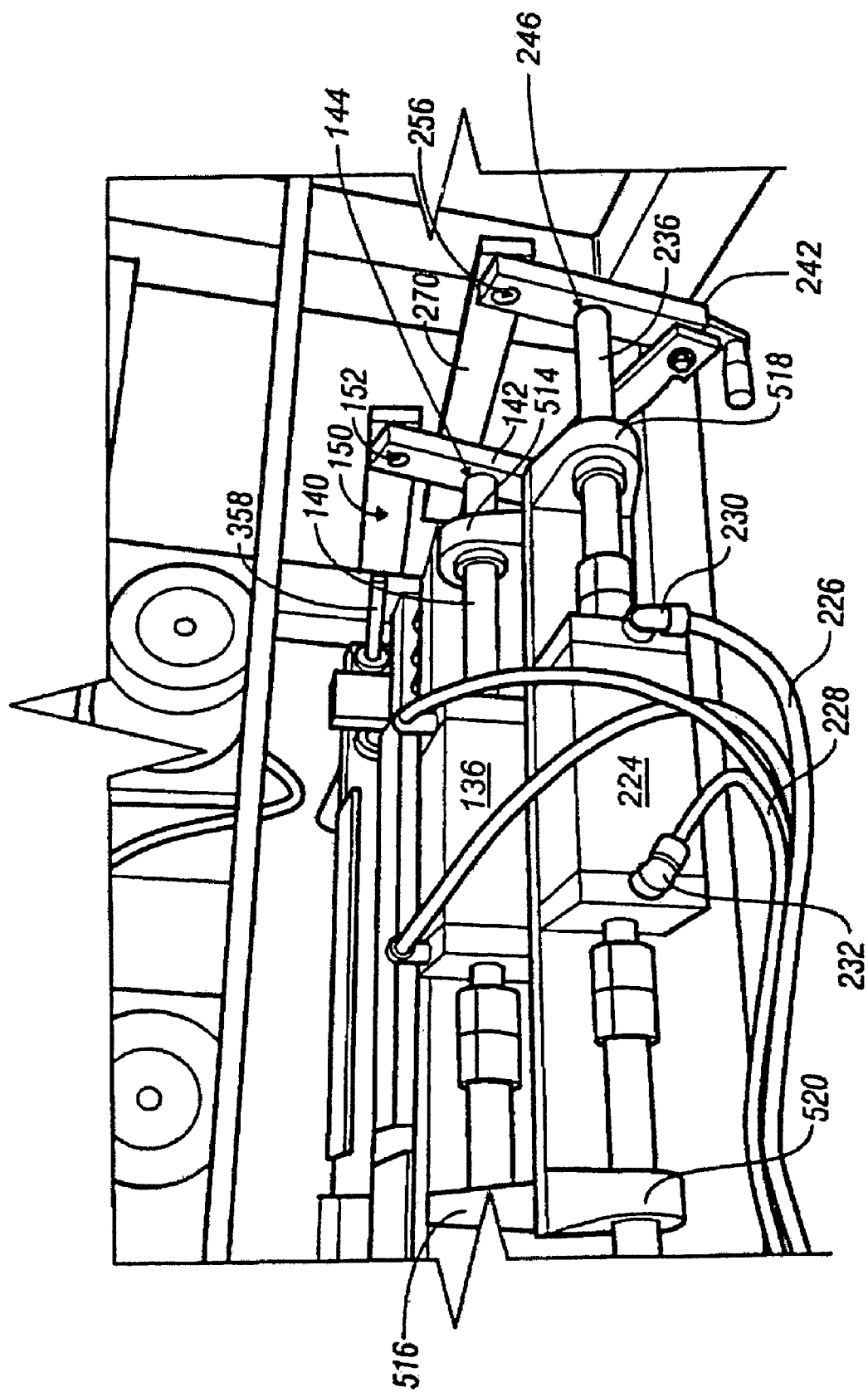
FIG. 7 of the drawings is a rear perspective view of the modular reciprocating heat seal jaw assembly of FIGS. 2–6 showing, in particular, a first reciprocal drive mechanism comprising a first air cylinder having a drive shaft extending laterally from either side thereof and a second reciprocal drive mechanism comprising a second air cylinder having a second drive shaft extending laterally therefrom with first and second rotating drive arms disposed on the distal ends of the first and second drive shafts and inner and outer drive arms pivotally mounted on the distal ends of the first and second rotating drive arms.

As further seen in FIGS. 3, 4 and 7 a plurality of pillow block bearings 514, 516, 518 and 520 are provided on frame 132 having first drive shaft 140 and second drive shaft 236 extending respectively through a pair of said pillow bearing blocks. Pillow block bearings support the drive shafts 140 and 236 during rotation.

Figure 8:
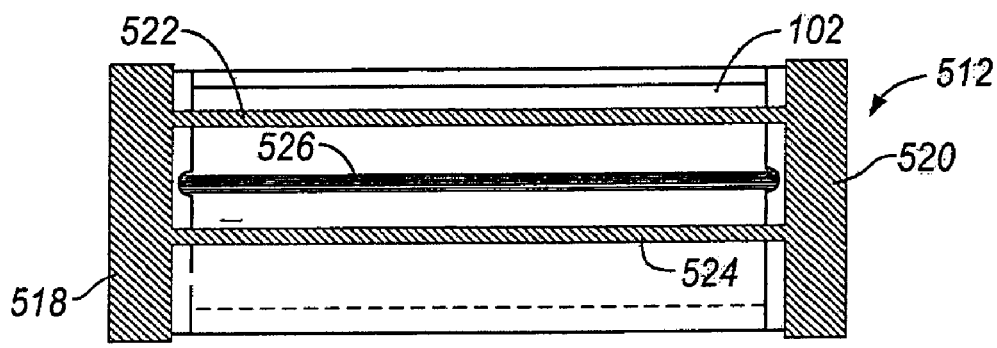
FIG. 8 of the drawings is a top elevational view of a topopening, pre-molded reclosable fastener strip for use with the modular reciprocating heat seal jaw assembly of FIGS. 2–6 showing vertical seal areas overlayed on the lateral flanges of the reclosable fastener strip and two longitudinal seal areas running parallel to the fastener strip.
Figure 9:
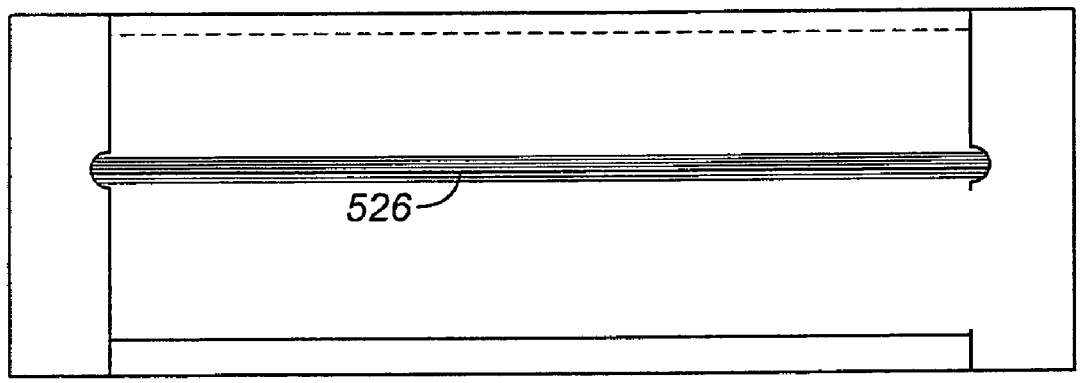
FIG. 9 of the drawings is a top elevational view of the reclosable fastener strip of FIG. 8 and the lateral ends thereof.
Figure 10:
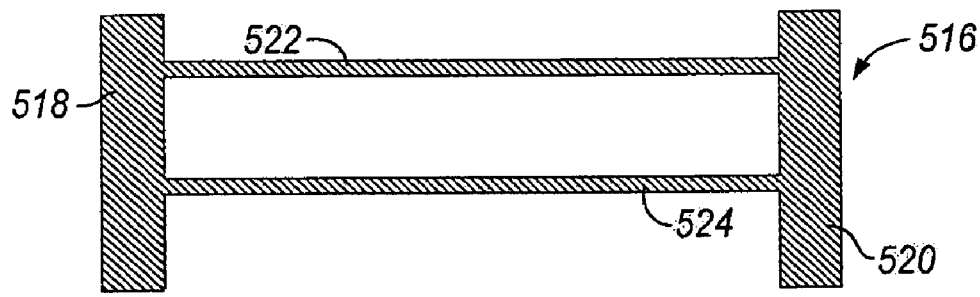
FIG. 10 of the drawings is a top elevational view of the seal configuration of FIG. 8 showing lateral seal areas and longitudinal seal areas.
Figure 11:
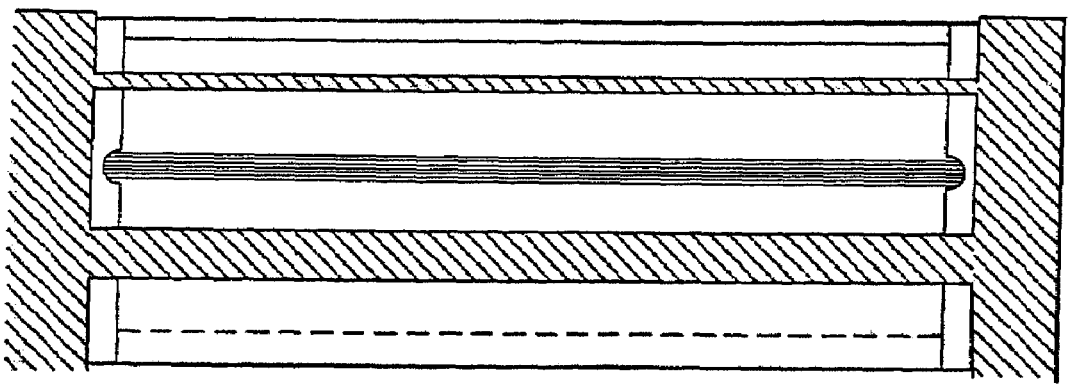
FIG. 11 of the drawings is a top elevational view of an alternate top-opening, pre-molded reclosable fastener strip for use with the modular reciprocating heat seal jaw assembly of FIGS. 2–6.

As seen in FIGS. 2–6, first sealing jaw 108 and second sealing jaw 110 are sized, constructed and arranged for cross sealing the web of thermoplastic material 104. The sealing jaws may be as little as ¼" in width or a parallelity of ribs may be provided for multiple cross seals. The width of the seal is determined by the width of the web of thermoplastic material 104 which may be as little as 3" or as much as 24" to 36," as required. As further seen in FIG. 2, third sealing jaw 208 and fourth sealing jaw 210 are specifically sized, constructed and arranged for sealing reclosable fastener strips 102 to web of thermoplastic material 104. As previously mentioned, reclosable fastener strips 102 are previously sealed in bag length intervals on the outer surface of web of thermoplastic material 104. After forming the web 104 into a tube 22 (FIGS. 17A and 17B) and longitudinally sealing it using conventional form-fill sealing equipment, then cross sealing web 104 using first sealing jaw 108 and second sealing jaw 110, third and fourth sealing jaws 208 and 210 are compressed against the outer surface of web of thermoplastic material 104. The back side of the web of thermoplastic material 104 is heated to a temperature of 330° F. plus or minus 25° F. so as to seal the back side of reclosable fastener strip 102 to the web of thermoplastic material 104. Third sealing jaw 208 and fourth sealing jaw 210 may contain heat resistant silicone rubber of 60 diameter for easy release from web 104, and are preferably constructed of aluminum. As shown in FIG. 10, the configuration of third sealing jaw 208 and fourth sealing jaw 210 results in the seal pattern 516 having wider, lateral seals (i.e., lateral seal areas) 518–520 and narrow, longitudinal seals (i.e., longitudinal seal areas) 522 and 524 above and below the interlocking fastener closures 526 (FIGS. 8 and 9). While a preferred seal pattern of the third sealing jaw 208 and fourth sealing jaw 210 is seen in FIG. 10, alternate sealing configurations, such as that illustrated in FIG. 11, may be utilized, as required.

Figure 12:
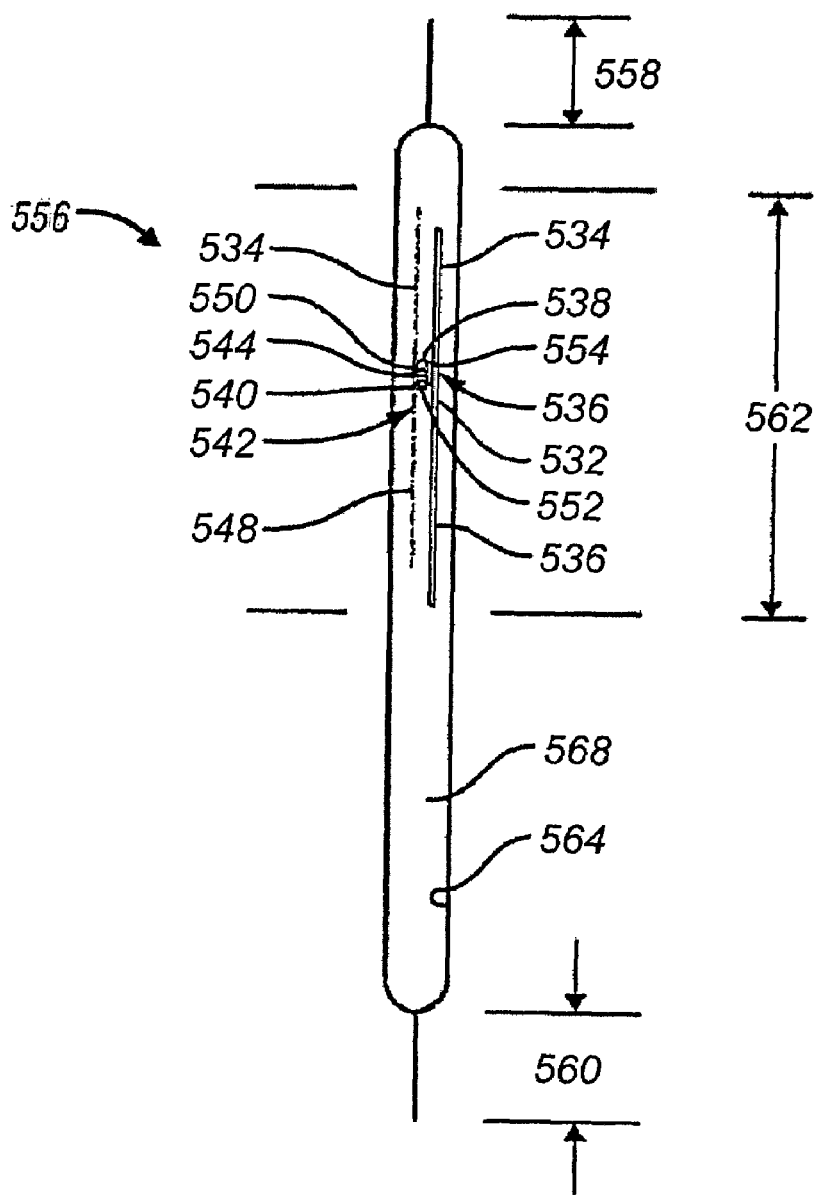
FIG. 12 of the drawings is a side cutaway view of a reclosable flexible container manufactured using the vertical form-fill-seal apparatus of FIG. 1, showing, in particular, a top seal on a bag, bottom seal on a bag, a pair of fastener profiles interlocked and sealed to interior surfaces of the bag walls.

As further seen in FIGS. 8 and 12, reclosable fastener strips 102 include a first reclosable fastener profile 530 having a base 532 and a pair of lateral and longitudinal flanges 534 and 536 extending vertically and horizontally therefrom A pair of upwardly extending closure members 538 and 540 extending from base 532. A second reclosable fastener profile 542 having a base 544 and a pair of lateral and longitudinal flanges 546 and 548 extending vertically and horizontally therefrom is provided. Second reclosable fastener profile 542 has a pair of upwardly extending closure members 550 and 552. Closure members 538 and 540 are constructed and arranged to digitally interlock with and provide an airtight and watertight seal with upwardly extending closure members 550 and 552. It should be noted in this regard that upwardly extending closure members 538 and 540 are connected to base 532 by means of hinge 554. Additionally, flange 546 extends higher than flange 534 within bag 556. Both the use of hinge 554 and the greater length of flange 546 results in a seal between closure members 550 and 552 with closure members 538 and 540 which is more difficult to open from within bag 556 than by separating flanges 534 and 546. In other words, the differential opening force created by the hinge 554 and the greater length of flange 546 prevent unintended opening of bag 556 from within. As further seen in FIG. 12, bag 556 includes an upper seal 558 and a vertical form fill lower seal 560. These seals are created by heated first sealing jaw 108 and heated second sealing jaw 110 and applying them to web 104. Third sealing jaw 208 and fourth sealing jaw 210 are applied against top opening jaw seal area 562 so as to seal the base 532 of first reclosable fastener 530 to the inside surface 564 of thermoplastic web 104 which has been formed into bag 556.

The use of a vertical form-fill-seal machine as shown in FIG. 17 of the drawings to form reclosable bags may be found in U.S. Pat. No. 6,177,172, inventor Yeager, which is incorporated by reference herein.

Returning to FIG. 2 of the drawings, a perforation knife (not shown) might be disposed in third sealing jaw 208 for perforating web of thermoplastic material 104 so as to allow digital access to first reclosable fastener 530 and second reclosable fastener 542, thereby allowing separation of closure elements 538 and 540 from closure elements 550 and 552 and access to the interior 568 of bag 556.

It is further shown in FIG. 17A, in order to separate individual bags such as bag 106 from web thermoplastic material 104, a cutting knife (not shown) is provided which may be mounted on first sealing jaw 108 with an anvil (not shown) on second sealing jaw 110 for cutting and separating bags from each other.

An additional example of sealing of reclosable fasteners to a web of plastic film may be found in U.S. Pat. No. 6,361,212, assigned to the present applicant which is also incorporated by reference. Further examples of form-filled-seal machines using reclosable fasteners may be found in U.S. Pat. No. 5,461,845 (inventor, Yeager).

Figure 13:
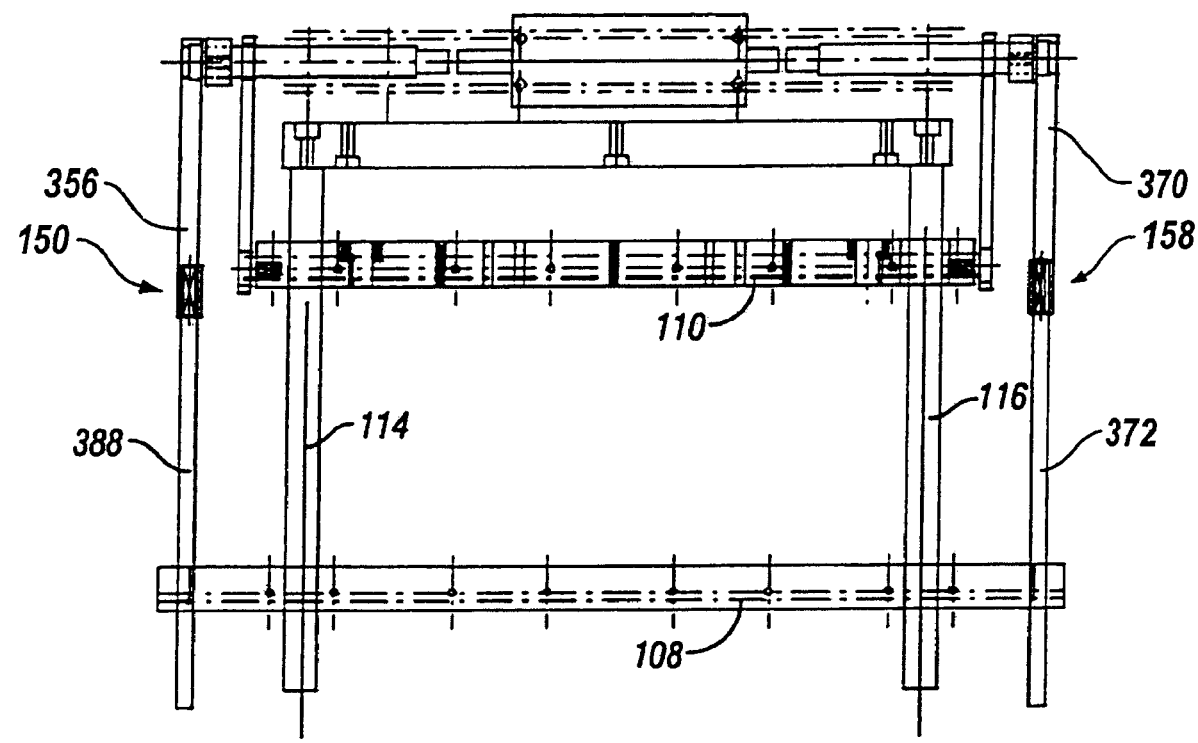
FIG. 13 of the drawings is a top schematic view of the first air cylinder, first drive shaft, first right and left rotating drive arms, first right and left outer and inner drive arms and first and second sealing jaws of the modular sealing jaw assembly of FIGS. 2–7.
Figure 14:
FIG. 14 of the drawings is a front schematic view showing first sealing jaw 108 above third sealing jaw 208 and arms 150, 158 and 254.
Figure 15:
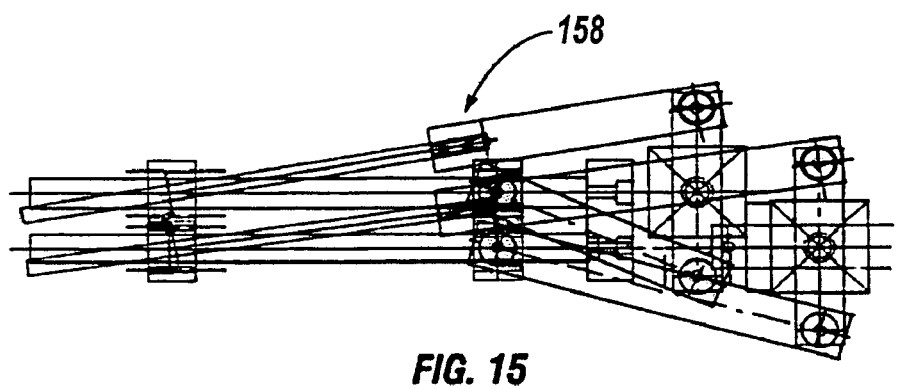
FIG. 15 of the drawings is a side-schematic view showing first and second left outer and inner linear drive arms moving first sealing jaw, second sealing jaw, third sealing jaw, fourth sealing jaw. One of the keys of the present invention is the movement of the first and second sealing jaws, independently of the third and fourth sealing jaws. As a result, more precise sealing of fastener profiles and proper alignment is provided.

It should be noted that the use of modular reciprocating sealing assembly 100 allows precise placement of third and fourth sealing jaws 208 and 210, result in the creation of airtight seals and precise compression of fastener strip 102 in pattern 516. The reciprocal movement of jaws 108, 110, 208 and 210 along shafts 114, 116, 202 and 204 may be seen in FIGS. 13 through 15. The movement of arms 150, 158, 166 and 176 is also shown. The interconnection of the assembly 100 keeps the jaws 108 and 110, 208 and 210 in precise alignment.

The invention claimed is:

1. A modular reciprocating heat seal jaw assembly for sealing a series of reclosable fastener strips to a web of thermoplastic film and for sealing said web of thermoplastic film into a series of reclosable bags, said jaw assembly comprising:

a first sealing jaw having a first and second lateral end;
a second sealing jaw having a first and second lateral end;
means for slidably mounting said first sealing jaw on a first pair of parallel shaft members, proximate to and perpendicular to said first and second lateral ends of said first sealing jaw, said shaft members being disposed in a substantially horizontal plane;
means for slidably mounting said second sealing jaw on said first pair of parallel shaft members proximate to and perpendicular to said first and second lateral ends of said second sealing jaw;
means for selectively effecting reciprocal movement of said first and second sealing jaws together and apart, as required; and
modular frame means for supporting said first and second sealing jaws and said first pair of parallel shaft members, and for maintaining a lateral and vertical position of said first and second sealing jaws; and wherein said means for selectively effecting reciprocal movement of said first and second sealing jaws together and apart comprises
a reciprocal drive mechanism; and
a first drive shaft extending laterally from said reciprocal drive mechanism, said first drive shaft having a first end and a second end; and
wherein said reciprocal drive mechanism comprises:
a first right rotating drive arm having a midpoint, a first distal end and a second distal end, wherein said first end of said first drive shaft is fixedly attached proximate said midpoint of said first right rotating drive arm so as to allow selective rotation of said first right rotating drive arm;
a first left rotating drive arm having a midpoint, a first distal end and a second distal end, wherein said second end of said first drive shaft is fixedly attached proximate said midpoint of said first left rotating drive arm so as to allow selective rotation of said first left rotating drive arm;

a first right outer linear drive arm having a proximal end and a distal end, wherein said first right outer linear drive arm is pivotally connected proximate said proximal end to said first right rotating drive arm proximate said first distal end thereof, and pivotally connected proximate said distal end to said first sealing jaw proximate said first lateral end thereof; and a first left outer linear drive arm having a proximal end and a distal end wherein said first left outer linear drive arm is pivotally connected proximate said proximal end to said first left rotating drive arm proximate said first distal end thereof, and pivotally connected proximate said distal end to said first sealing jaw proximate said second lateral end thereof;

whereby rotation of said first drive shaft causes said first right and left outer linear drive arms to be selectively moved in the direction of said first sealing jaw, or pulled in the direction away from said first sealing jaw, causing said first sealing jaw to slide either towards or away from said second sealing jaw on said first pair of parallel shaft members.

2. The modular reciprocating heat seal jaw assembly of claim 1, wherein said reciprocal drive mechanism further comprises:

a first right inner linear drive arm having a proximal end and a distal end, wherein said first right inner linear drive arm is pivotally connected proximate said proximal end to said first right rotating drive arm proximate said second distal end thereof, and pivotally connected proximate said distal end to said second sealing jaw proximate said first lateral end thereof; and a first left inner linear drive arm having a proximal end and a distal end, wherein said first left inner linear drive arm is pivotally connected proximate said proximal end to said first left rotating drive arm proximate said second distal end thereof pivotally connected proximate said distal end to said second sealing jaw proximate said second lateral end thereof;

whereby rotation of said first drive shaft causes said first right and left inner linear drive arms to be selectively moved in the direction of or in the direction away from said second sealing jaw along said first pair of parallel shaft members simultaneously with and opposite to said movement of said first right and left outer linear drive arms, thereby selectively bringing said first and second sealing jaws together and apart, as required.

3. The modular reciprocating heat seal jaw assembly of claim 2, wherein said reciprocal drive mechanism comprises a first air cylinder having a plurality of air lines extending therefrom and connected thereto at a first and second connector and a source of pressurized air connected to said plurality of air lines; said first air cylinder being constructed and arranged to rotate said first drive shaft in a first desired direction for a selected degree of rotation when said source of pressurized air is introduced into said first connector and for rotating said first drive shaft in the opposite direction and to an opposite degree of rotation when said source of pressurized air is introduced into said second connector, thereby causing said first right and left outer and inner linear drive arms to effect horizontal movement of said first and second sealing jaws so as to bring said first and second sealing jaws together and apart, as required.

4. The modular reciprocating heat seal jaw assembly of claim 1 and further comprising:

a second pair of parallel shaft members disposed in a substantially horizontal plane parallel to said first pair of parallel shaft members;

a third sealing jaw having a first and second lateral end;

a fourth sealing jaw having a first and second lateral end;

means for selectively effecting reciprocal movement of said third and fourth sealing jaws together and apart, as required;

said second pair of parallel shaft members being attached to said third and fourth sealing jaws proximate said first and second lateral ends thereof whereby greater stability is provided during movement of said third and fourth sealing jaws and greater precision is provided in positioning of said third and fourth sealing jaws during sealing of said series of reclosable fastener strips to said web of thermoplastic film.

5. The modular reciprocating heat seal jaw assembly of claim 4, wherein said means for selectively effecting reciprocal movement of said third and fourth sealing jaws comprises:

a second air cylinder having a plurality of air lines extending therefrom and connected thereto at a third and fourth connector, and a source of pressurized air connected to said plurality of air lines;

a second drive shaft extending laterally from said second air cylinder, said second drive shaft having a first end and a second end;

a second right rotating drive arm having a midpoint a first distal end and a second distal end, wherein said first end of said second drive shaft is fixedly attached proximate said midpoint of said second right rotating drive arm so as to allow selective rotation of said second right rotating drive arm;

a second left rotating drive arm having a midpoint, a first distal end and a second distal end, wherein said second end of said second drive shaft is fixedly attached proximate said midpoint of said second left rotating drive arm so as to allow selective rotation of said second left rotating drive arm;

a second right outer linear drive arm having a proximal end and a distal end, wherein said second right outer linear drive arm is pivotally connected proximate said proximal end to said second right rotating drive arm proximate said first distal end thereof, and pivotally connected proximate said distal end to said third sealing jaw proximate said first lateral end thereof;

a second left outer linear drive arm having a proximal end and a distal end, wherein said second left outer linear drive arm is pivotally connected proximate said proximal end to said second left rotating drive arm proximate said first distal end thereof, and pivotally connected proximate said distal end to said third sealing jaw proximate said second lateral end thereof;

a second right inner linear drive arm having a proximal end and a distal end, wherein said second right inner linear drive arm is pivotally connected proximate said proximal end to said second right rotating drive arm proximate a second distal end thereof, and pivotally connected proximate said distal end to said fourth sealing jaw proximate said first lateral end thereof; and a second left inner linear drive arm having a proximal end and a distal end, wherein said second left inner linear drive arm is pivotally connected proximate said proximal end to said second left rotating drive arm proximate said second distal end thereof, and pivotally connected proximate said distal end to said fourth sealing jaw proximate said second lateral end thereof;

said second air cylinder being constructed and arranged to rotate said second drive shaft in a first desired direction for a selected degree of rotation when said source of pressurized air is introduced into said third connector and for rotating said second drive shaft in the opposite direction and to an opposite degree of rotation when said source of pressurized air is introduced into said fourth connector, thereby causing said second right and left outer linear drive arms to effect horizontal movement of said third sealing jaw and said second right and left inner linear drive arms to effect horizontal movement of said fourth sealing jaw so as to bring said third and fourth sealing jaws together and apart, as required.

6. The modular reciprocating heat seal jaw assembly of claim 5, wherein said pivotal connections of said third sealing jaw to said second right and left outer linear drive arms comprises:

a third and fourth ball joint respectively mounted proximate said first and second lateral ends of said third sealing jaw, said second right outer linear drive arm being pivotally connected to said third ball joint proximate said distal end of said second right outer linear drive arm, and said second left outer linear drive arm being pivotally connected to said fourth ball joint proximate said distal end of said second left outer linear drive arm.

7. The modular reciprocating heat seal jaw assembly of claim 6 further comprising:

a third spring member extending axially from said third ball joint;

a fourth spring member extending axially from said fourth ball joint;

whereby said second right outer linear drive arm extends through said third ball joint and through said third spring member;

whereby said second left outer linear drive arm extends through said fourth ball joint and through said fourth spring member; and a lock nut threadably attached to each of said second right and left outer linear drive arms proximate said distal end, thereof whereby said second right and left outer linear drive arms are fixedly connected respectively to said third and fourth ball joints, but are vertically and horizontally pivotable therein.

8. The modular reciprocating heat seal jaw assembly of claim 7, wherein each of said third and fourth ball joints further comprises shock absorber means for substantially affixing the axial position of said second right and left outer linear drive arms while allowing pivotal movement thereof and absorption of shock during reciprocal movement of said third and fourth sealing jaws.

9. The modular reciprocating heat seal jaw assembly of claim 4, wherein said third and fourth sealing jaws are sized, constructed and arranged for sealing said series of said reclosable fastener strips to a side of said web of thermoplastic film.

10. The modular reciprocating heat seal jaw assembly of claim 4 further comprising a vertical form-fill-seal machine for forming said web of thermoplastic film into said series of reclosable bags, each reclosable bag of said series of reclosable bags having a reclosable fastener strip of said series of reclosable fastener strips contained therein and heat sealed thereto.

11. The modular reciprocating heat seal jaw assembly of claim 10, wherein said web of thermoplastic film has a first side wherein said series of reclosable fastener strips are sequentially sealed thereon in bag-length intervals; said vertical form-fill-seal machine comprising means for forming said web of thermoplastic film into a tube, said tube having an inside surface and another inside surface, said tube further having said series of reclosable fastener strips sealed to said inside surface of said tube; and said third and fourth sealing jaws are sized, constructed and arranged to seal an unsealed side of said reclosable fastener strip of said series of reclosable fastener strips to said another inside surface of said tube.

12. The modular reciprocating heat seal jaw assembly of claim 11, wherein each of said third and fourth sealing jaws comprises:

a pair of rectangularly shaped, vertical side seal surfaces, each side surface being sized, disposed and separated by a sufficient distance to seal lateral flanges of said at least said unsealed side of said reclosable fastener strip of said series of fastener strips to said another inside surface of said tube without interfering with interlocking and disengaging of closure members of said reclosable fastener strip of said reclosable fastener strips; and a pair of rectangularly shaped, horizontal seal surfaces, each horizontal seal surface being sized, disposed and separated at a sufficient distance to seal longitudinal flanges of said at least said unsealed sides of said reclosable fastener strip of said series of reclosable fastener strips to said another inside surface of said tube without interfering with interlocking and disengaging of said closure members;

whereby, when said third and fourth sealing jaws are brought together by said means for selectively effecting reciprocal movement of said third and fourth sealing jaws and said third and fourth sealing jaws are heated, at least said unsealed side of said reclosable fastener strip of said series of fastener strips are sealed to said another inside surface of said tube.

13. The modular reciprocating heat seal jaw assembly of claim 12, wherein said third and fourth sealing jaws are moved by said means for selectively effecting reciprocal movement of said third and fourth sealing jaws to a position in contact with each other, and to exert a force of 150 pounds, plus or minus 50 pounds, of pressure against each other.

14. The modular reciprocating heat seal jaw assembly of claim 4 and further comprising means for forming said web of thermoplastic film into a reclosable bag of said series of reclosable bags.

15. The modular reciprocating heat seal jaw assembly of claim 4 and further comprising:

a perforation knife fixedly attached to at least one of said third and fourth sealing jaws for perforating said web of thermoplastic film, so as to allow access to a reclosable fastener strip of said series of reclosable fastener strips within a reclosable bag of said series of reclosable bags, thereby allowing separation of closure elements of said reclosable fastener strip and access to an interior of said reclosable bag.

16. The modular reciprocating heat seal jaw assembly of claim 4, wherein said means for selectively effecting reciprocal movement of said third and fourth sealing jaws comprises:

a second drive shaft, said second drive shaft having a first end and a second end;

a second right rotating drive arm having a midpoint, a first distal end and a second distal end, wherein said first end of said second drive shaft is fixedly attached proximate said midpoint of said second right rotating arm so as to allow selective rotation of said second right rotating drive arm;

a second left rotating drive arm having a midpoint, a first distal end and a second distal end, wherein said first end of said second drive shaft is fixedly attached proximate said midpoint of said second left rotating drive arm so as to allow selective rotation of said second left rotating drive arm;

a second right outer linear drive arm having a proximal end and a distal end, wherein said second right outer linear drive arm is pivotally connected proximate said proximal end to said second right rotating drive arm proximate said first distal end thereof and proximate said distal end to said third sealing jaw proximate said first lateral end thereof;

a second left outer linear drive arm having a proximal end and a distal end, wherein said second left outer linear drive arm is pivotally connected proximate said proximal end to said second left rotating drive arm proximate said first distal end thereof, and pivotally connected proximate said distal end to said third sealing jaw proximate said second lateral end thereof;

a second right inner linear drive arm having a proximal end and a distal end, wherein said second right inner linear drive arm is pivotally connected proximate said proximal end to said second right rotating drive arm proximate a second distal end thereof, and pivotally connected proximate said distal end to said fourth sealing jaw proximate said first lateral end thereof; and a second left inner linear drive arm having a proximal end and a distal end, wherein said second left inner linear drive arm is pivotally connected proximate said proximal end to said second left rotating drive arm proximate said second distal end thereof, and pivotally connected proximate said distal end to said fourth sealing jaw proximate said second lateral end thereof;

said means for selectively effecting reciprocal movement being constructed and arranged to rotate said second drive shaft in a first desired direction for a selected degree of rotation, and for rotating said second drive shaft in the opposite direction and to an opposite degree of rotation as required, thereby causing said second right and left outer linear drive arms to effect horizontal movement of said third sealing jaw and said second right and left inner linear drive arms to effect horizontal movement of said fourth sealing jaw so as to bring said third and fourth sealing jaws together and apart, as required.

17. The modular reciprocating heat seal jaw assembly of claim 1, wherein said means for selectively effecting reciprocal movement of said first and second sealing jaws together and apart comprises reciprocating said first and second sealing jaws between a first abutting position in which said web of thermoplastic film is cross sealed and a second separated position which allows said web of thermoplastic film to be advanced between said first and second sealing jaws.

18. The modular reciprocating heat seal jaw assembly of claim 1, wherein said pivotal connections of said first sealing jaw to said first right and left outer linear drive arms comprise:

a first and second ball joint respectively mounted proximate said first and second lateral ends of said first sealing jaw said first right outer linear drive arm being pivotally connected to said first ball joint proximate said distal end of said first right outer linear drive arm, and said first left outer linear drive arm being pivotally connected to said second ball joint proximate said distal end of said first left outer linear drive arm.

19. The modular reciprocating heat seal jaw assembly of claim 18 further comprising:

a first spring member extending axially from said first ball joint;

a second spring member extending axially from said second ball joint;

whereby first right outer linear drive arm extends through said first ball joint and through said first spring member, whereby said first left outer linear drive arm extends through said second ball joint and through said second spring member; and a lock nut threadably attached to each of said first right and left outer linear drive arms proximate said distal ends thereof whereby said first right and left outer linear drive arms are fixedly connected respectively to said first and second ball joints, but are vertically and horizontally pivotable therein.

20. The modular reciprocating heat seal jaw assembly of claim 18, wherein each of said first and second ball joints further comprises shock absorber means for substantially affixing the axial position of said first right and left outer linear drive arms while allowing pivotal movement thereof and absorption of shock during reciprocal movement of said first and second sealing jaws.

21. The modular reciprocating heat seal jaw assembly of claim 1, wherein each of said first right and left outer linear drive arms comprises a first, rectangular section and a second, rod-shaped section extending axially away from said first, rectangular portion, each of said first right and left outer linear drive arms farther comprises a bore extending through a respective one of said first, rectangular sections and a fastening means extending through said bore for rotatably connecting said respective one of said first, rectangular sections to a respective one of said first right and left rotating drive arms proximate said first distal end of said respective one of said first right and left rotating drive arms.

22. The modular reciprocating heat seal jaw assembly of claim 21, wherein said fastener means comprises a bolt extending through said bore and through a corresponding bore in a side of said respective one of said first right and left rotating drive arms proximate said first distal end thereof, said bolt having a head thereon for retaining said bolt in said bore and a lock nut attached proximate a distal end of said bolt, said lock nut being disposed on an inner surface of said respective one of said first right and left rotating drive arms proximate said first distal end thereof for rotatably connecting by means of said lock nut and said bolt each of said first right and left outer linear drive arms to said respective one of said right and left rotatable drive arms.

23. The modular reciprocating heat seal jaw assembly of claim 1, wherein said means for slidably mounting said first and second sealing jaws on said first pair of parallel shaft members comprises:

a plurality of sleeve bearings laterally disposed on said first and second sealing jaws, each of said sleeve bearings also being coaxially disposed about one shaft member of said first pair of parallel shaft members whereby said first and second sealing jaws are slidably supported and maintained in parallel to each other as they are advanced together and apart.

24. The modular reciprocating heat seal jaw assembly of claim 1 and further comprising:

wire members connected to said first and second sealing jaws;

an electric power source connected to said wire members for providing means to heat said first and second sealing jaws; and temperature control means connected to said electric power source and said wire members for measuring the temperature of said first and second sealing jaws, heating said first and second sealing jaws and maintaining said first and second sealing jaws at a desired temperature.

25. The modular reciprocating heat seal jaw assembly of claim 1 and further comprising a plurality of pillow block bearings on said modular frame means having said first drive shaft extending rotatably through one of the pillow block bearings for supporting said first drive shaft during rotation.

26. The modular reciprocating heat seal jaw assembly of claim 1, wherein said first and second sealing jaws are sized, constructed, and arranged for cross sealing said web of thermoplastic film so as to facilitate forming said series of reclosable bags therefrom.

* * * * *